United States Patent [19]
Takamoto et al.

[11] Patent Number: 5,903,724
[45] Date of Patent: May 11, 1999

[54] METHOD OF TRANSFERRING PACKET DATA IN A NETWORK BY TRANSMITTING DIVIDED DATA PACKETS

[75] Inventors: Yoshifumi Takamoto, Fuchu; Hiroki Kanai, Higashi-Yamato; Tadahiro Takase, Oita; Katsuyoshi Kitai, Kokubunji; Yoshimasa Masuoka, Kodaira, all of Japan

[73] Assignee: Hitachi, Ltd., Tokyo, Japan

[21] Appl. No.: 08/708,955

[22] Filed: Sep. 6, 1996

[30] Foreign Application Priority Data

Sep. 8, 1995 [JP] Japan ................................ 7-231023

[51] Int. Cl.⁶ .............................. G06F 3/00; G06F 13/00
[52] U.S. Cl. ................................ 395/200.3; 395/200.54; 395/200.57; 395/200.58; 395/200.64; 395/200.68
[58] Field of Search ........................ 395/200.01, 200.03, 395/200.08, 200.09, 200.11, 200.12, 200.13, 200.14, 200.17, 200.19, 200.2, 311, 750, 611, 182.03, 230, 200.31, 200.54–200.62, 200.64, 200.68, 200.72, 200; 370/389, 440

[56] References Cited

U.S. PATENT DOCUMENTS

| | | | |
|---|---|---|---|
| 5,038,347 | 8/1991 | Courtois | 370/440 |
| 5,274,782 | 12/1993 | Chlalasani et al. | 395/311 |
| 5,408,609 | 4/1995 | Malgogne et al. | 395/200.58 |
| 5,560,021 | 9/1996 | Vook et al. | 395/750.05 |
| 5,572,678 | 11/1996 | Homma et al. | 395/200.57 |
| 5,617,424 | 4/1997 | Murayama et al. | 370/389 |
| 5,617,541 | 4/1997 | Albanese et al. | 395/200.37 |

FOREIGN PATENT DOCUMENTS

| | | | |
|---|---|---|---|
| 62-248337 | 10/1987 | Japan | H04L 11/20 |
| 2-228844 | 9/1990 | Japan | H04L 12/56 |
| 4-61448 | 2/1992 | Japan | H04L 12/55 |
| 4-245833 | 9/1992 | Japan | H04L 12/56 |

OTHER PUBLICATIONS

Fibre Channel: Connection to the Future, "Physical and Signaling Layer", (1994) pp. 11–19.

Network Protocols, "TGP Input Processing"(1989) pp. 368–375.

Kazama et al, "Novel Packet Transmission Scheme for Personal Communication System", IEEE 1994 Conference Record (Cat. No. 94TH0622–1), pp. 516–520, Sep.27 Oct. 01 1994.

Hara et al, "Throughput Performance of SAW–ARQ Protocol with Adaptive Packet Length in Mobile Packet Data Transmission", IEEE Transactions on Vehicular Technology, vol. 45, No, 3, pp. 561–569, Aug. 1996.

Primary Examiner—Parshotam S. Lall
Assistant Examiner—Bharat Barot
Attorney, Agent, or Firm—Antonelli, Terry, Stout & Kraus, LLP

[57] ABSTRACT

A communication controller at the sending computer divides data transferred from a host into sub-ACK unit packets and transfers them sequentially to a destination without waiting for the sub-ACK's being subsequently provided by the destination. A communication controller at the receiving computer issues a sub-ACK to the sending computer for each of the sub-ACK unit packet, if the sub-ACK packet has been normally received and otherwise issues retransmission request for the sub-ACK unit packets and merges data included in the sub-ACK unit packets into the initial data, after they are normally received.

13 Claims, 27 Drawing Sheets

FIG. 13

| DESTINATION ID | DIVISION UNIT | RESPONSE TIME | COMMUNI-CATION LOAD | DIVISION DIRECTION |
|---|---|---|---|---|
| A | 2KB | 10ms | 10% | +1 |
| B | 4KB | 20ms | 30% | +1 |
| C | 16KB | 50ms | 10% | -1 |
| - | N | N | N | N |
| - | N | N | N | N |

FIG. 18

| PACKET ID (1501) | DIVISION ID (1502) | ACK RECEIPT (1503) | RETRANSMISSION COUNT (1504) |
|---|---|---|---|
| 1 | 1 | RECEIVED | 0 |
| | 2 | RECEIVED | 0 |
| | 3 | YET TO BE RECEIVED | 2 |
| | 4 | RECEIVED | 3 |
| 2 | 1 | YET TO BE RECEIVED | 0 |
| | 2 | RECEIVED | 0 |
| | 3 | RECEIVED | 0 |
| ... | ... | ... | |

METHOD OF TRANSFERRING PACKET DATA IN A NETWORK BY TRANSMITTING DIVIDED DATA PACKETS

BACKGROUND OF THE INVENTION

The present invention relates to a method for transmitting data at high speed via a network and more particularly, to a method for transmitting large quantities of data over long distances via a network.

Where computers can transmit data between them they enjoy the advantage of sharing data. A plurality of computers may share one or more files therebetween by way of the file server These functions are all implemented through the availability of data transmission between computers or between any one of the configured computers and a file server.

Data is transmitted generally via a network connected to a communication controller included in a computer The communication controller is usually furnished on a single board. In operation, the communication controller receives a data transmission request or a data reception request from a computer and exchanges date with a communication target in units called packets. Each packet, which is the unit of data communication, contains user data and control information including destination and other information. The communication controller is incorporated in the host and is directly connected to an internal bus thereof. The host has a program called the operating system working therein. The operating system includes communication control software that controls the communication controller.

A typical network is what is known as the Fibre Channel As discussed in "Fibre Channel Connection to the Future" (Fibre Channel Association, 1994, pp. 11–19), the Fibre Channel is available for communication between computers as well as between a computer and disk drives. The Fibre Channel is controlled functionally by layers FC0 through FC4 for each function of the fiber channel. Of these layers, FC0 defines the electrical characteristics of physical cables, FC1 stipulates the methods for encoding and decoding data, and FC2 specifies the data format relevant to the Fibre Channel. FC3 and FC4 designate logical communication methods. The Fibre Channel can connect a plurality of devices of different types, the capability being implemented by the layer FC4 converting data in format for use by a plurality of devices on the Fibre Channel. Illustratively, the Fibre Channel may be connected to disk drives as well as network devices. FC3 is the layer that provides common control over data communication. FC0 through FC4 are generally implemented by hardware, specifically on a board comprising a plurality of LSI's. With the Fibre Channel, the above-mentioned communication control software is a program that controls disk drives and networks In operation, the communication control program issues requests to FC4 of the Fibre Channel. Upon receipt of a request from the communication control program, the Fibre Channel converts the data to its own data format in accordance with the FC4 provisions, forwards the data after conversion through the layers FC3, FC2, FC1 and FC0, in that order, and sends to the destination device. Apart from the packets mentioned earlier, the Fibre Channel is capable of transferring data up to 2 KB long each as stipulated by FC2. On the Fibre Channel, any data exceeding the 2 KB length limit is divided into units of 2 KB each when transferred by the layer FC2.

The communication control software may be functionally divided into two major layers a protocol processing program and a device control program The protocol processing program receives data communication requests from a user program. For data transmission the protocol processing program converts user data into packets according to the communication protocol specific to the network. For data reception the protocol processing program extracts the user data from the transmitted packets. The device control program is a program that requests the communication controller to transmit packets. The primary function of the device control program is to control the hardware of the communication controller. In transmitting data the device control program typically executes the following instruction string:

(1) get_register (STATUS)
(2) set_register (buf_addr)
(3) set_register (pkt_length)
(4) set_register (IN, DMA_GO)

The instruction (1) above reads the status of the communication controller and checks to see if the status is normal The instruction (2) transmits the location of target data in the host to the communication controller. The instruction (3) notifies the communication controller of the length of the packet to be transmitted. The instruction (4) starts the hardware for transmitting the data from the host to the communication controller The processing above allows the communication controller to analyze control information held in the packet and to transmit the target data to the destination of communication. Thereafter, the protocol processing program waits for an acknowledgment (abbreviated to ACK hereunder) to arrive from the destination indicating that the data has been normally transmitted. The above processes (1) through (4) are carried out by writing and reading information to and from control registers in the communication controller. In like manner, the device control program typically executes the following instruction string upon receiving data:

(1) get_register (STATUS)
(2) set_register (buf_addr)
(3) set_register (pkt_length)
(4) set_register (OUT, DMA_GO)

The instruction (1) above reads the status of the communication controller and checks to see if the status is normal The instruction (2) transmits the location of target data in the host to the communication controller. The instruction (3) notifies the communication controller of the length of the packet to be transmitted. The instruction (4) starts the hardware for transmitting the data from the communication controller to the host. Thereafter, the protocol processing program generates an ACK and sends it to the destination of communication indicating that the data has been normally transmitted The processing above allows the communication controller to analyze the control information held in the packet and to transmit the target data to the destination of communication.

What characterizes the above type of communication is that an ACK is transmitted and received to verify the normal transfer of data every time a packet has been transmitted. With commonly implemented networks, the packet size is limited to be 1 to 4 kilobytes. To transmit data exceeding the size of one packet requires dividing the data into a plurality of packets that may be transmitted. In such a case, a plurality of ACK's are to be transmitted and received regarding each set of user data divided into a plurality of packets. After one packet is transmitted, the next packet cannot be transmitted unless and until the ACK for the most recently transmitted packet has been returned. This prohibition of transmission of the next packet is for communication. In data communication, if any packet is not transmitted normally, the same packet must be retransmitted. This requires retaining the most recently transmitted data in the memory on the transmitting side in preparation for possible retransmission. How long the data should remain in the memory is determined upon receipt of an ACK. That is, when the destination of communication has returned an ACK indicating the normal reception of the data, then the packet retained on the transmitting side is discarded.

One disadvantage of the above method of data transmission is that it takes time to transmit data. This is because the next packet cannot be transmitted until the ACK for the current packet is returned. A solution to this problem is described illustratively by Samuel J. Leffer et al., in "The Design and Implementation of the 4.3BSD UNIX Operating System" (Addison-Wesley Publishing Company, Inc., 1989, pp. 368–375). The solution involves transmitting a plurality of packets sequentially. In the above-cited reference, the protocol processing program stipulates that an ACK is to be issued for every n packets (i.e., n times the packet size). Within that unit of data transmission, packets may be transmitted and received sequentially. For example, suppose that the packet size is 1 KB, that an ACK is issued in units of 10 KB, and that 20 KB of user data are to be transmitted In this case, the protocol processing program on the data transmitting side initially receives 10 KB of data from the user program The protocol processing program divides the 10-KB data into 10 packets of 1 KB each. The 10 packets are sent consecutively to the destination Having transmitted the 10 packets, the transmitting side waits for an ACK to be returned by the receiving side. The receiving side puts together the packets of 1 KB each as they are continuously sent in. When the last 1-KB packet has arrived, the receiving side returns an ACK to the transmitting side. Upon receipt of the ACK, the transmitting side verifies that all data has been transmitted normally. If everything is normal, the protocol processing program of the transmitting side will perform the same process on the next 10-KB data. If the 10 packets were not transmitted normally, the same 10 packets are retransmitted. This method offers better data transfer performance than the method described earlier because packets can be transmitted consecutively within, say, the 10-packet range.

SUMMARY OF THE INVENTION

When a set of data is transmitted conventionally the data is divided into packets and an ACK is returned every time a packet has been transmitted and received If no ACK comes back, the next packet cannot be transmitted The time required to return an ACK depends largely on the distance over which the data is transmitted The longer the transmitting distance the more prolonged the time required to return an ACK. This makes it difficult to transmit one packet after another continuously because an appreciable wait time can occur before an ACK arrives following the transmission of each packet. Where longer transmitting distances are involved, the network usability drops precipitously because of the prolonged ACK wait time. This impedes the network from being utilized effectively. The problem becomes more pronounced with high-speed data transmission media such as optical fiber cables. That is, the ability of the media to transmit data rapidly is canceled out by the increased time in which ACK's are awaited.

The solution to the problem proposed by the above-cited reference increases the size of the data for which one ACK is returned so that data may be transmitted at the high possible speed. More specifically, data items each smaller than an enlarged ACK are transmitted consecutively. By enlarging the ACK, the proposed method appears to provide faster data transmission than the earlier method. The greater the ACK, the more efficient data transmission is supposed to become. However, the proposed method is effective only if all data is transmitted normally. Long-distance communication is known to diminish the rate at which data is transmitted normally to the destination, mainly due to cable noise and data losses through network relay computers. Most network relay computers are connected to a plurality of networks. In such setups, memory constraints in any relay computer can truncate received data. The longer the transmitting distance is, the growing number of relay computers are installed to repeat data within or between networks. Numerous relay computers are liable to a growing probability of data loss. According to the method proposed by the above-cited reference, if any data item within a given ACK unit is lost, the entire ACK unit must be retransmitted. If retransmission overhead is taken into consideration in an environment of a high probability of data loss, the performance of data transfer can be lower than that of the earlier method.

According to the present invention, one ACK unit is divided into a plurality of sub-ACK unit packets each furnished with a tag indicating the pre-division position. The divided packets are transmitted sequentially. Upon receipt of each divided packet, the receiving side communication controller returns a sub-ACK comprising the result of the reception to the transmitting side communication controller. Having received all packets, the receiving side communication controller determines the order of the packets as per the contents of their tags indicating the pre-division position and merges their data parts. The transmitting side checks the received sub-ACK's for the result of the reception to see if any packet need retransmission. Any packet is retransmitted if determined to be necessary When all sub-ACK's have been normally received the transmitting side puts them into a single ACK and notifies the request source thereof.

Because one ACK unit is divided into a plurality of sub-ACK unit packets for consecutive transmission, data transfer performance is enhanced. Since a packet retransmission request may be issued for each sub-ACK, drops in the transmitting performance are minimized in long-distance communication setups.

Other objects, features and advantages of the present invention will become apparent in the following specification and accompanying drawings.

BRIEF DESCRIPTION OF THE DRAWINGS

FIG. 13 is a schematic view illustrating the structure of a transmission destination table;

FIG. 18 is a conceptual view depicting the constitution of an ACK table;

DESCRIPTION OF THE PREFERRED EMBODIMENTS

First Embodiment

Preferred embodiments of the invention will now be described in detail with reference to the accompanying drawings.

Figure 1:
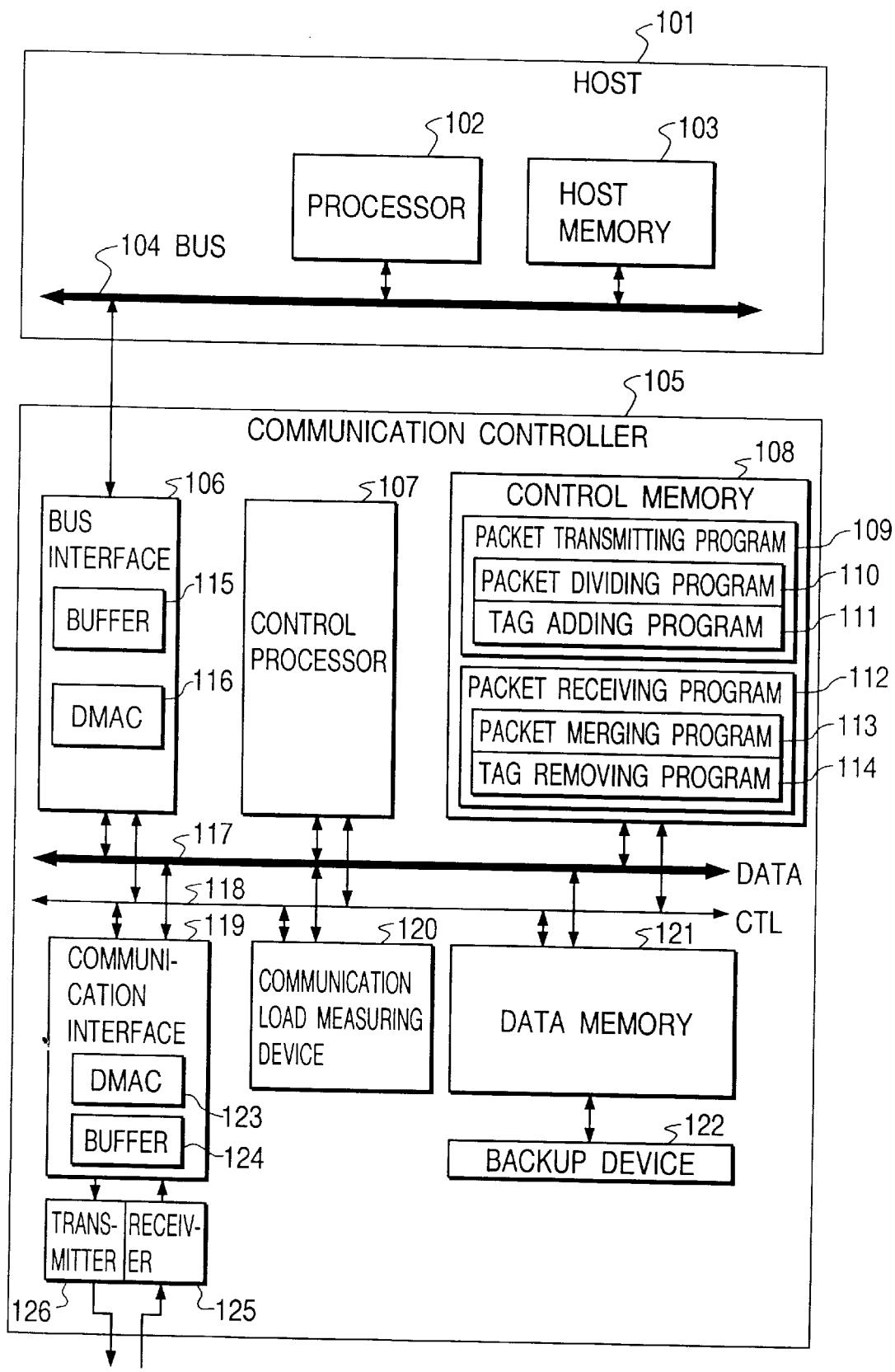
FIG. 1 is an overall block diagram outlining a computer system which realizes a method for transmitting data via a network according to the present invention.

FIG. 1 is an overall block diagram outlining a computer system which adopts a method for transmitting data via a network according to the present invention In FIG. 1, reference numeral 101 is a host and 105 is a communication controller. The host 101 comprises a processor 102 for executing user programs and so on, a host memory 103 for accommodating the user program, user data, etc., and a bus 104. The bus 104 is connected to a communication controller 105 or the like for communicating with the processor 102 host memory 103 and outside of the computer The communication controller 105 includes a bus interface 106 that communicates with the bus inside the host 101, a control processor 107 that controls the hardware in the communication controller 105, a control memory 108 that stores control software to be executed by the control processor 107, a communication interface 119 that communicate with and a data memory 121 and externally connected devices, a communication load measuring device 120 that measures the load of the network to which the communication controller 105 is connected, the data memory 121, a data bus 117 for data transmission, a control bus 118 for transmitting control information, a backup device 122 that backs up the contents of the data memory 121, a transmitter 126, and a receiver 125. The transmitter 126 and receiver 125 are connected to an external network. The bus interface 106 comprises a buffer 115 that temporarily retains data transferred between the host memory 103 and the communication controller 105, and a DMAC 116 that transfers data between the host memory 103 and the communication controller 105. The communication interface 119 is made up of a buffer 124 that temporarily holds data transferred between the data memory 121 and an externally connected device, and a DMAC 123 that transfers data between the data memory 121 and the external device. The control memory 108 stores control software to be executed by the control processor 107. Reference numerals 109 and 112 denote control software dealing with packet transmission and packet reception, respectively. The packet transmitting program 109 comprises a packet dividing program 110 and a tag adding program 111, etc. The packet receiving program 112 includes a packet merging program 113 and a tag removing program 114, etc.

Figure 2:
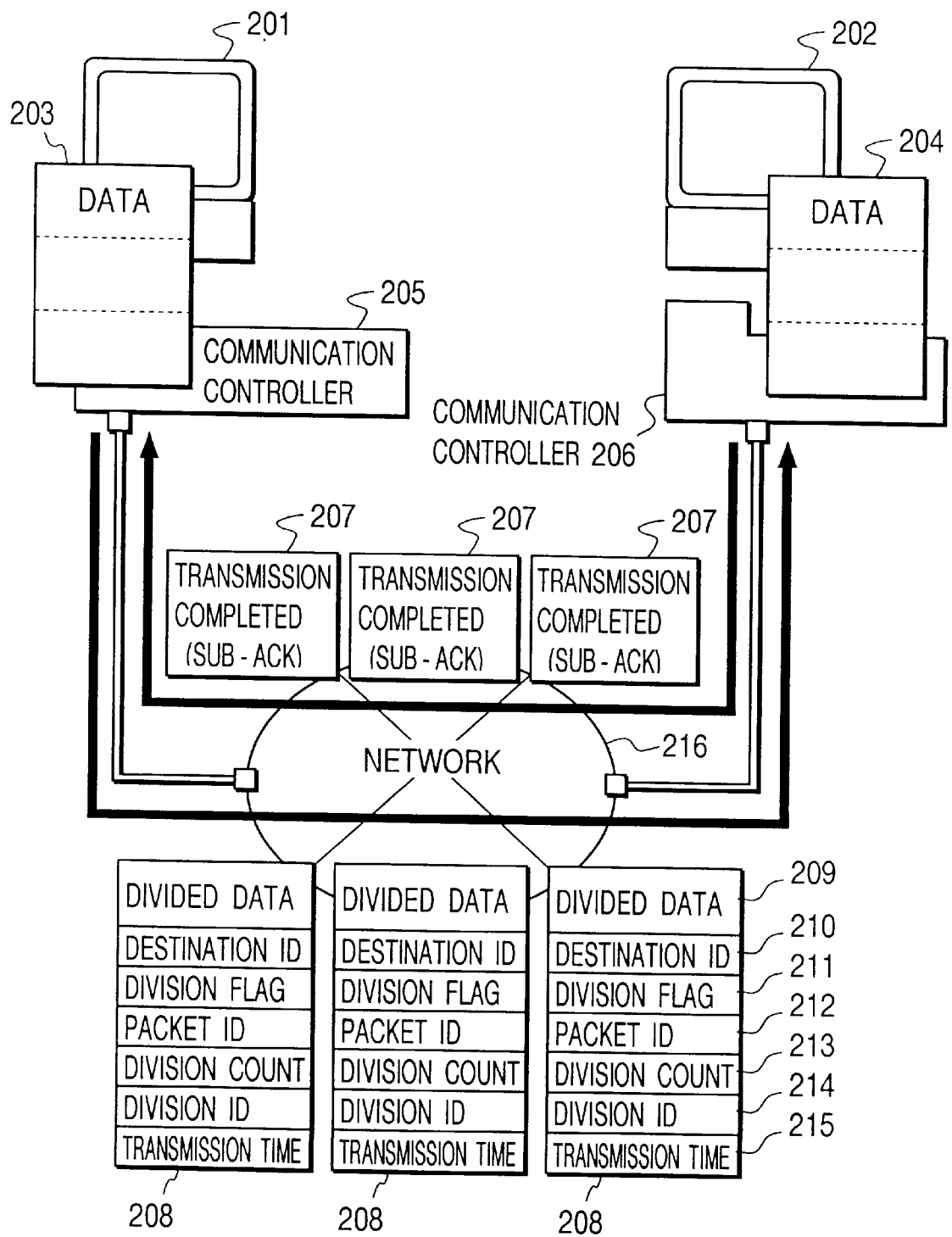
FIG. 2 is a method diagram for explaining the data transmission according to the present invention.

How the system of FIG. 1 works will now be described by referring to FIG. 2. What is shown in FIG. 2 is a process of data transmission and reception between a host 201 (corresponding to the host 101 in FIG. 1) and a host 202 (corresponding to the host 101 in FIG. 1), both connected to a network 216. Specifically, the host 201 transmits data 203 constituting an ACK unit of the host 201, the data 203 being received (as data 204) by the computer 202. The ACK unit is a unit of data for which an ACK must be returned before the next packet of data can be transmitted. The computers 201 and 202 are connected to communication controllers 205 and 206 respectively. The data 203 sent from the computer 201 is divided in the communication controller 205 into three data 209 each constituting a sub-ACK unit. Each divided data 209 is constructed as a packet 208.

This setup may be elaborated in connection with the Fibre Channel as follows. The Fibre Channel is connected to disk drives and network devices. An example of data communication between computers in the Fibre Channel will be explained by reference to FIG. 2. The control programs to control the connected devices run on the computers 201 and 202. Each of the control programs to control the disk drives and networks issues a request for data (corresponding to 203) to the communication controller (corresponding to 205) of the Fibre Channel. In response, the communication controller (205) divides the data (203) into units of up to 2 KB each, the maximum unit of data transfer by the Fibre Channel, to be sent as divided data (209). The divided data 209 thus transferred are received by the destination communication controller (corresponding to 206) of the Fibre Channel and reconstructed therein as packets 208 for transfer to the computer 202. Specifically, of the Fibre Channel layers FC0 through FC4, the layer FC4 takes care of data division control. These arrangements make it possible to practice the invention without modifying the existing control software.

Returning to FIG. 2, besides its user data (i.e., divided data) 209, each packet 208 is furnished with tags such as a destination ID 210, a flag 211 indicating a division of the data 203, a packet ID 212, a division count 213 (number of divided data), a division ID 214 indicating where the divided data is located in the post-division data order, and a transmission time 215 at which the packet is transmitted Upon reception of each data, the communication controller 206 removes the tags from each packet so as to reconstruct the initial data 204 During data reconstruction, the communication controller 206 refers to the division flag 211, packet ID 212, division count 213 and division ID 214 indicating the post-division data order. For each packet, the communication controller 206 returns a sub-ACK 207 indicating completion of data transmission. If any one of the three transmitted packets has developed a transmission error, the occurrence of the error is written into the corresponding sub-ACK 207. In response, the communication controller 205 retransmits only the packet corresponding to the sub-ACK in question. Where any of the divided packets has developed transmission error, only the faulty packet is retransmitted; there is no need to retransmit all packets 208. When all sub-ACK's are normally returned, the three sub-ACK's are integrated into one ACK and the host 101 is notified of the normal completion of data transmission. Because the target data is divided into sub-ACK units each furnished with a division flag 211, a packet ID 212, a division count 213 and a division ID 214 indicating the post-division data order, the divided data are transmitted and received as an independent packet each through parallel packet transmission. The sub-ACK's are merged into one ACK which is then transferred to the source of the request. The procedure here is equivalent to conventional communication protocol and contributes to minimizing the amount of changes needed in the software of the host where the invention is applied. Details of the hardware and software of the above setup will be described later.

Figure 3:
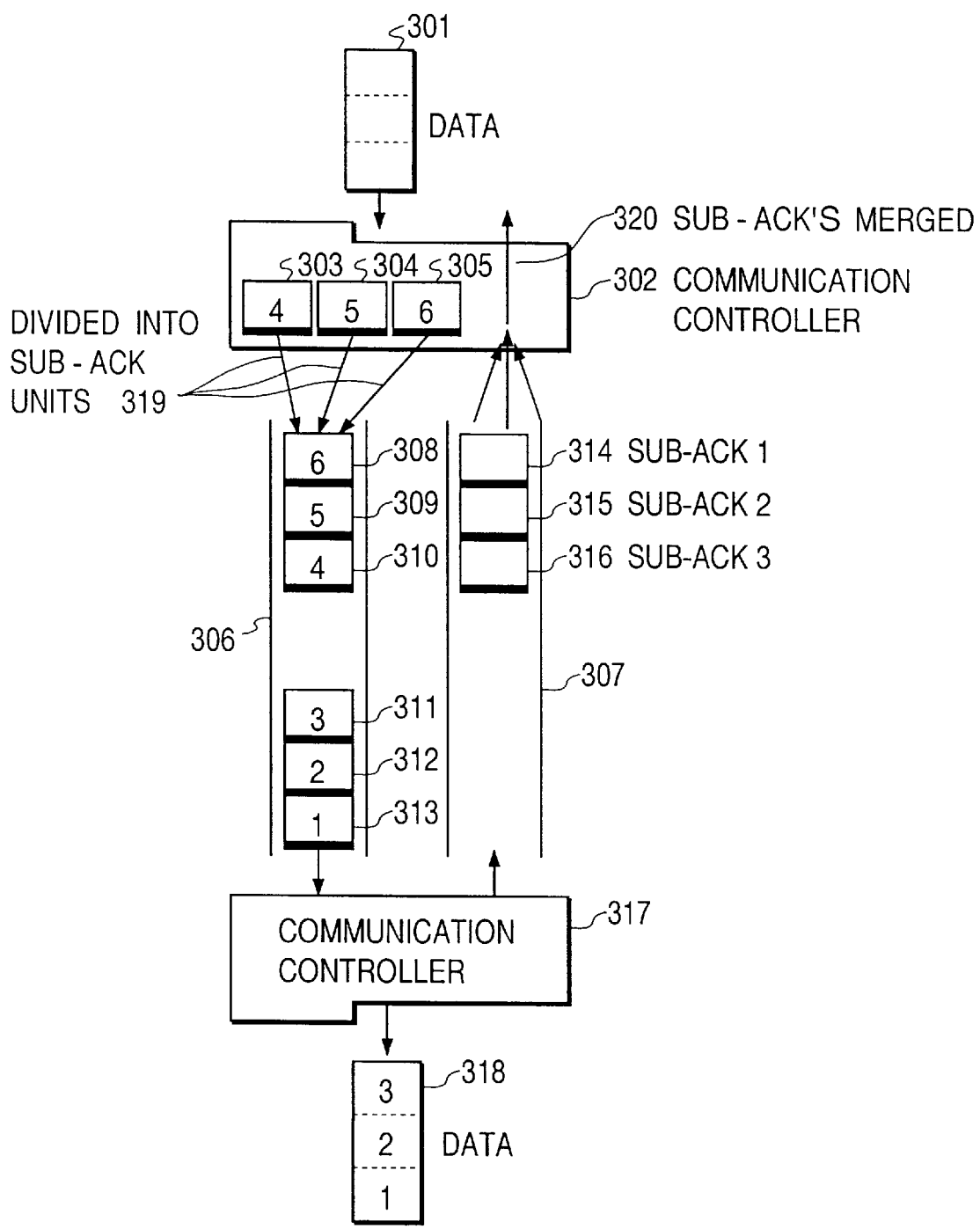
FIG. 3 is another diagram explaining the effects of the present invention.

FIG. 3 is a diagram for showing effects of the present invention. As with the setup of FIG. 2, the example of FIG. 3 divides an ACK unit of user data into three sub-ACK units (319) for consecutive packet transmission. Specifically a communication controller 302 transfers user data 301 to be received by another communication controller 317. The communication controller 302 divides the data 301 into three packets each furnished with tags. The packets are outputted consecutively onto a transmission path 306 (308 through 310). Packets 311 through 313 denote packets which include divided data of user data that were outputted earlier than the user data 301. The communication controller 317 removes tags from the packets 311 to 313 which include the previously outputted user data to reconstruct the initial data user (318). For the packets 311 through 313, the communication controller 317 returns sub-ACK's 314 through 316 respectively. When all sub-ACK units have been returned, the sub-ACK's are merged into one ACK (320) which is sent to the source of the request. Unlike the conventional arrangement in which the next packet cannot be transmitted until an ACK is returned for the current packet, the embodiment of the invention waits for the return of an ACK only between the packets 308 through 310 on the one hand, and the packets 311 through 313 on the other. The result is data transmission at an enhanced speed. Because the sub-ACK's are returned over a path different from the transmission path, there is no possibility of collision between the data and sub-ACK's. This is another advantage of the invention.

Figure 4:
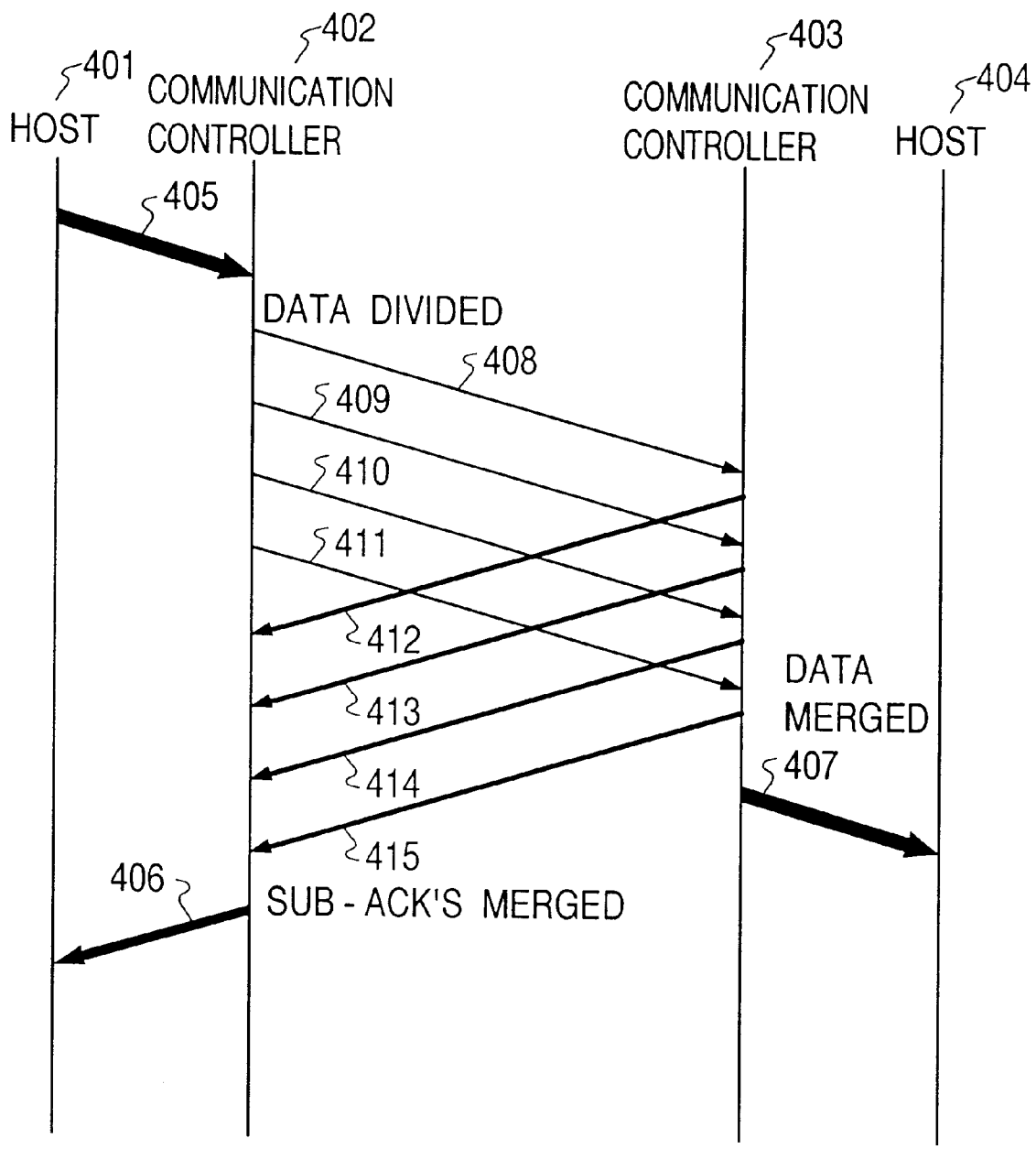
FIG. 4 is a timing chart of the first embodiment.

FIG. 4 is a timing chart showing the flow of control of the first embodiment. FIG. 4 depicts an example in which a host 401 transfers data 405 to another host 405. The user data 405 sent from the host 401 to a communication controller 402 is divided by the latter into a plurality of sub-ACK units (408 through 411) which are transmitted consecutively to the destination. Upon receiving the data, a communication controller 403 returns a sub-ACK for each of the divided sub-ACK unit packets (412 through 414). The communication controller 403 further merges the divided packets for data transfer to the host (407). Meanwhile, the communication controller 402 receives a plurality of sub-ACK's and merges them into one ACK which is returned to the host. In this manner, the user data is divided and transmitted in units of sub-ACK's, each data division being transmittable independently, whereby the data transfer performance is improved.

Figure 5:
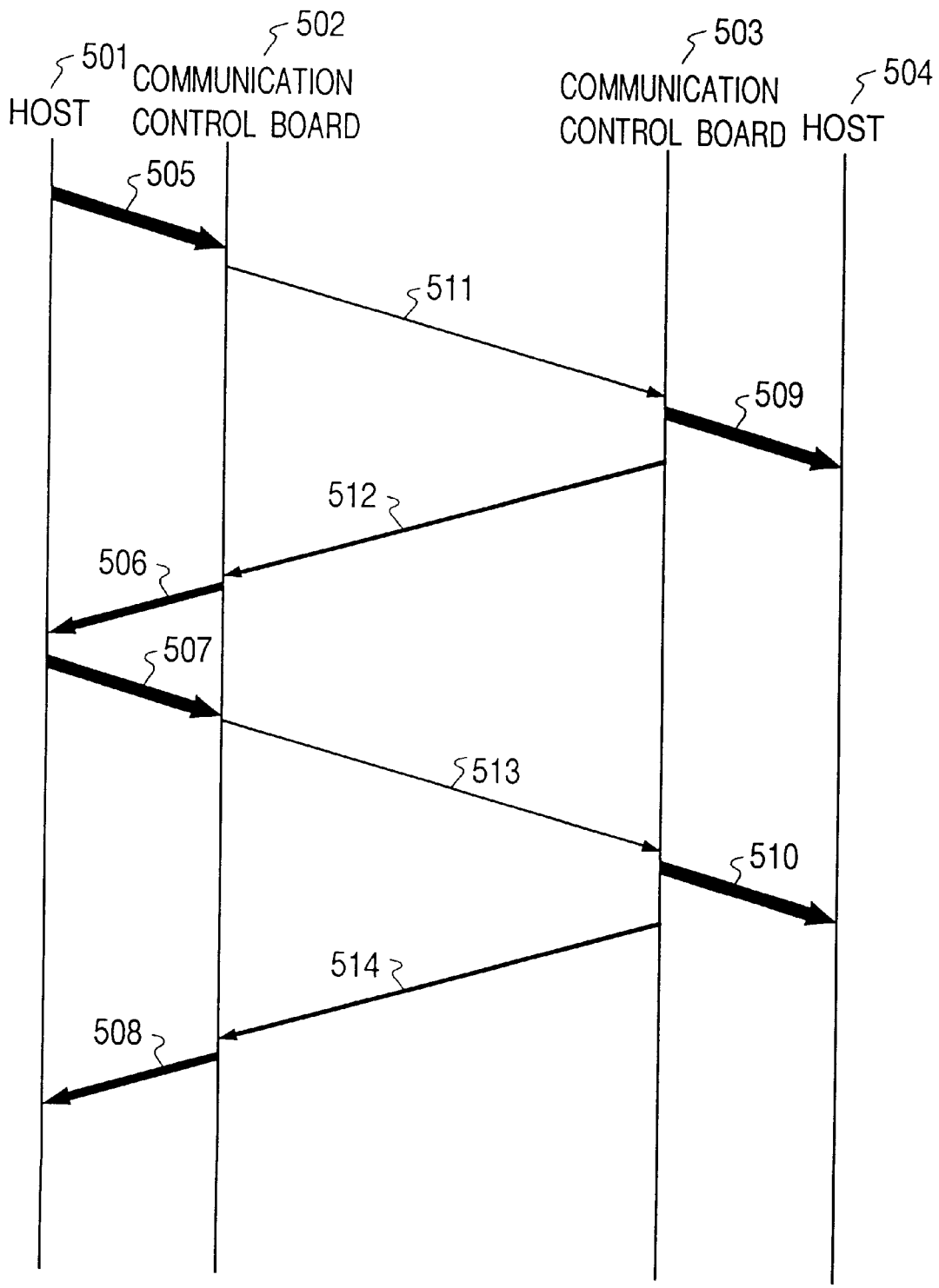
FIG. 5 is a timing chart of one conventional method for transmitting data via a network.
Figure 6:
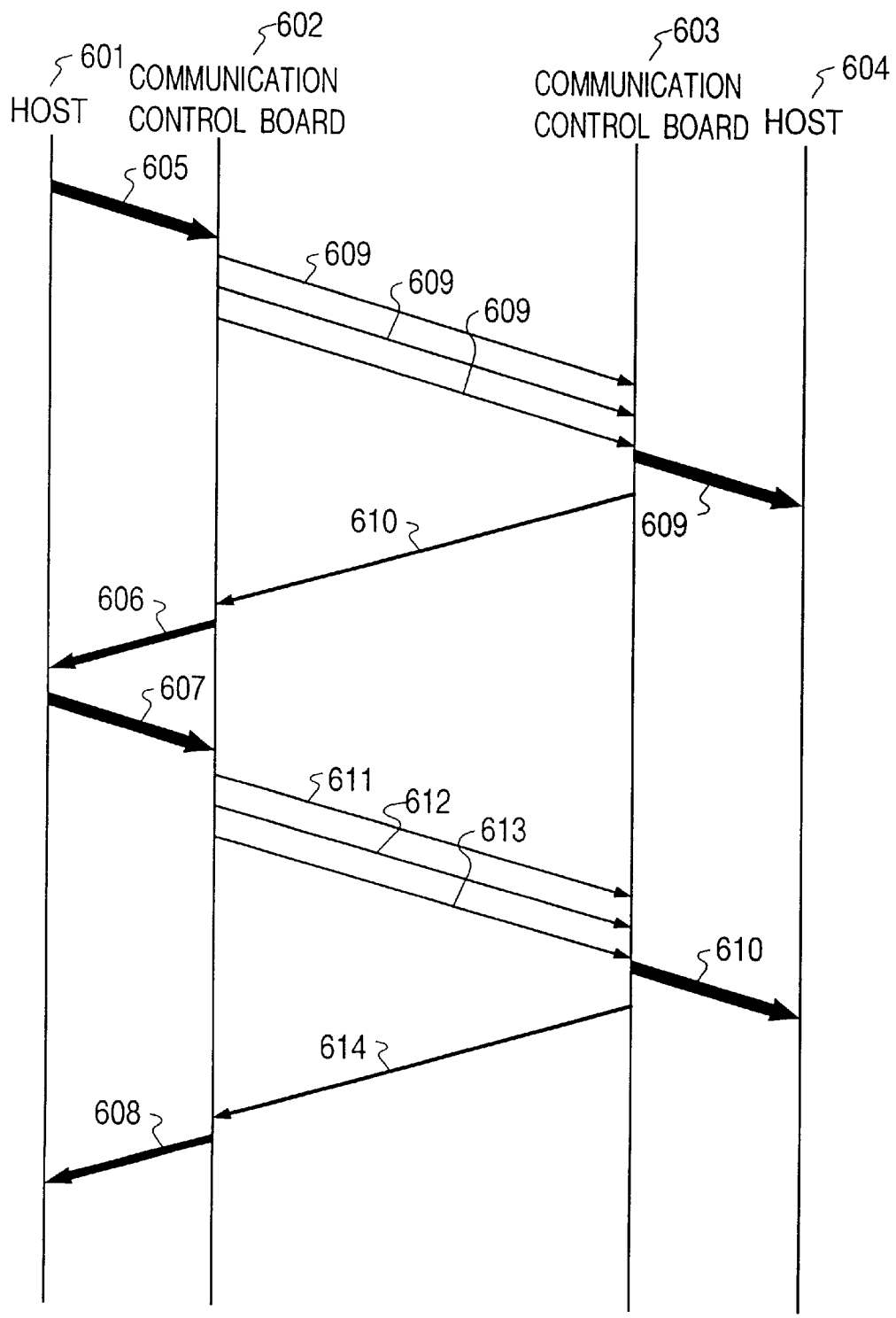
FIG. 6 is a timing chart of another conventional method for transmitting data via a network.

Below is a comparison of the first embodiment with typical prior art communication methods whose workings are illustrated in FIGS. 5 and 6. FIG. 5 shows a conventional method wherein an ACK is returned for each of the packets (505, 507) transmitted by a host 501. According to the method of FIG. 5, hosts 501 and 504 or communication controllers 502 and 503 transmit data and ACK for each data transfer request from a user program. Because it takes time before each ACK is returned with this method, a prolonged time period is required before a succeeding packet is transmitted. FIG. 6 depicts another conventional method which improves transfer performance by dividing a set of user data into a plurality of packets and by transmitting those packets. According to the method of FIG. 6, a data receiving communication control board 603 returns only one ACK for the entire set of user data (605 or 607). This means that if any one of the divided packets has developed transmission error, all packets need to be retransmitted. Where long communication distances are involved, the conventional method is subject to a growing probability of data losses and can diminish the performance of data transfer instead of improving it. These pitfalls are circumvented by the first embodiment of the invention using sub-ACK units. The sub-ACK units make it possible to verify which of the divided packets has developed an error. Therefore, even transmission data over long distances requires small amount of data to be retransmitted and thus enjoy higher speeds of data transfer.

Figure 7:
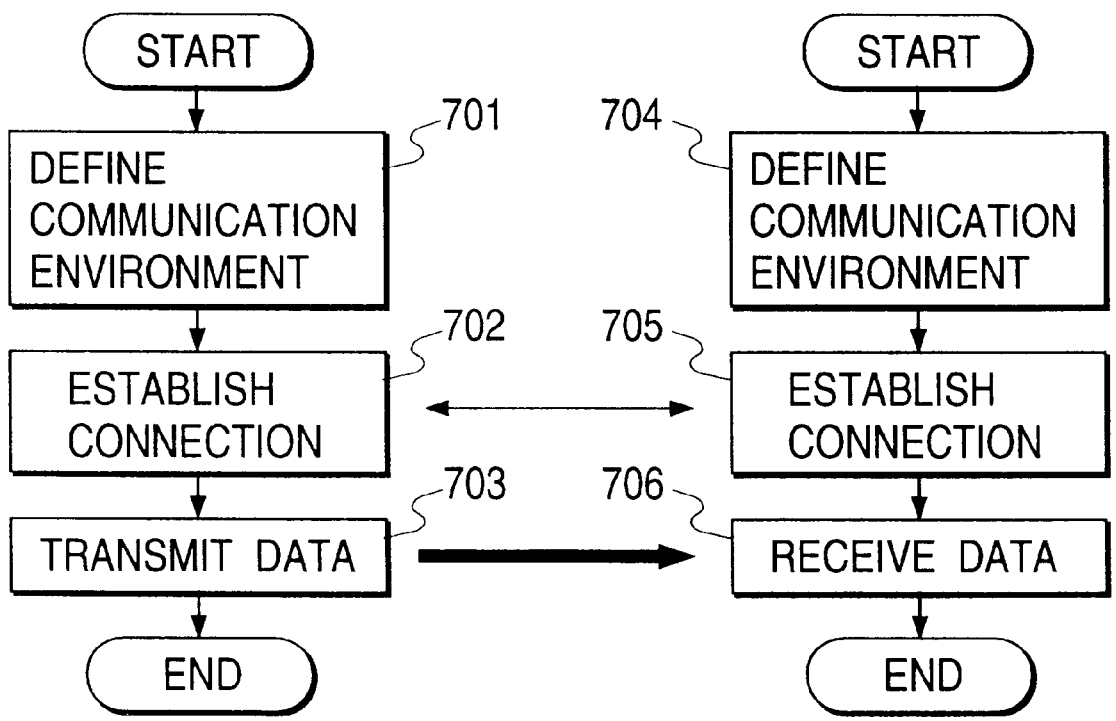
FIG. 7 is a flowchart of steps showing how a user program of the first embodiment typically works.

How the first embodiment works will now be described in more detail by referring to the accompanying drawings from FIG. 7 on. FIG. 7 shows an example of user programs. This is an example of data communication between the user program on the transmitting side (701 through 703) and the user program on the receiving side (704 through 706). Steps 701 and 704 define the environment necessary for communication. At this point, communication is yet to take place between the two programs. Steps 702 and 705 check to see if a communication target and is ready to communicate. Step 703 transmits user data to the communication target checked in step 702. There is no need for the user program to become aware of the packet size in effect. That is, there are no concept of a packet size or an ACK unit to be taken into account at this stage of communication. The packet size and ACK unit are concepts defined by the operating system 2403, to be described later.

Figure 8:
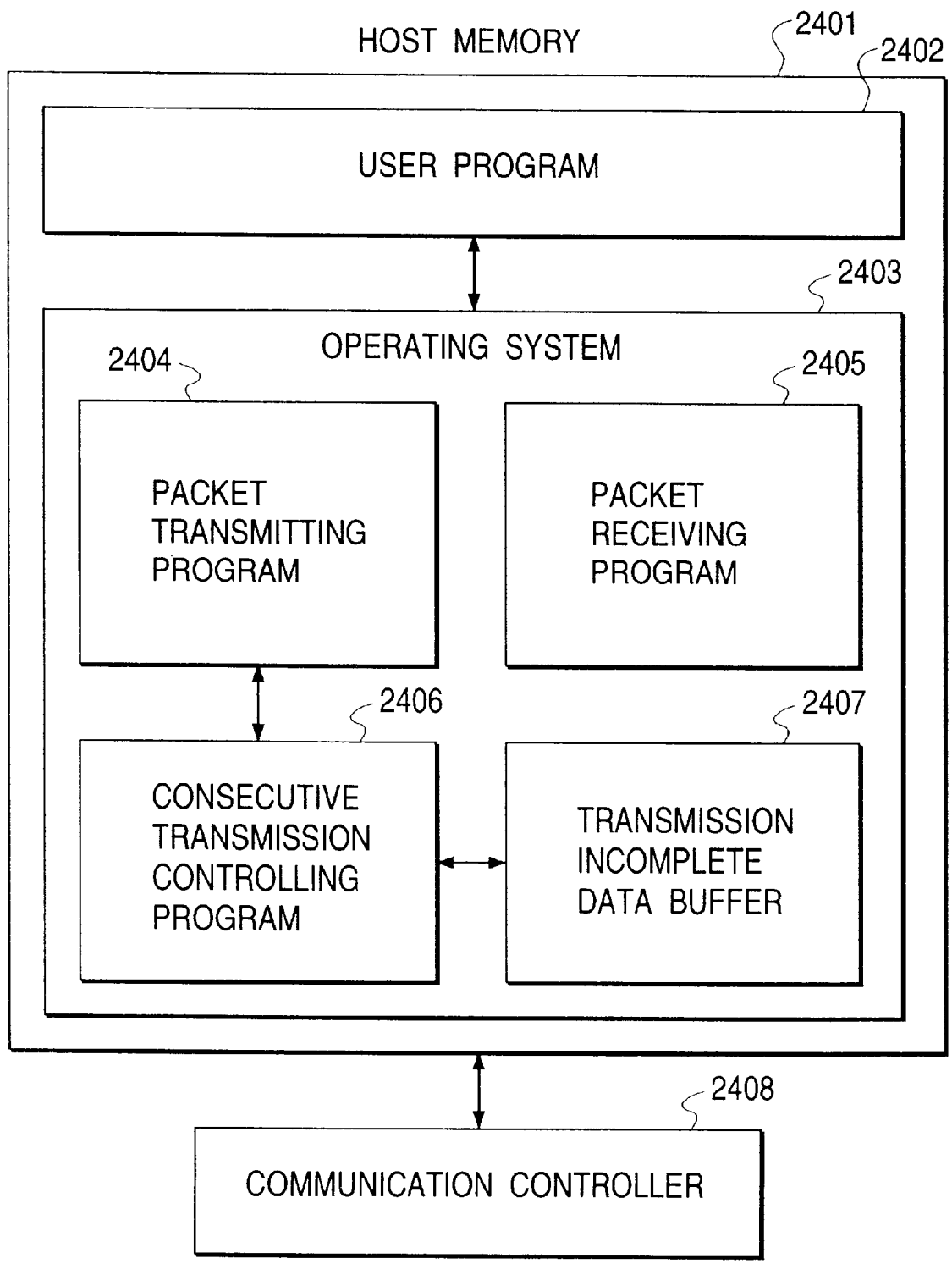
FIG. 8 is a block diagram showing the constitution of the operating system of the first embodiment.

FIG. 8 shows the constitution of the programs in a host memory 2401 (corresponding to the host memory 103 in FIG. 1). When a user program 2402 issues a communication request, a processing request is transferred to the operating system 2403. The communication processing is carried out by a packet transmitting program 2404 and a packet receiving program 2405 inside the operating system 2405. The packet transmitting program 2404 and packet receiving program 2405 are known programs that define ACK units. Whereas the conventional system has a communication controller 2408 (corresponding to the communication controller 105 of FIG. 1) directly controlled by the packet transmitting program 2404 and packet receiving program 2405, the first embodiment of the invention has its packet transmitting program 2404 connected to a consecutive transmission controlling program 2406 and a transmission incomplete data buffer 2407. The consecutive transmission controlling program 2406 is capable of enlarging the ACK unit of the packet transmitting program 2404. Details of the consecutive transmission controlling program 2406 and transmission incomplete data buffer 2407 will be described next.

Figure 9:
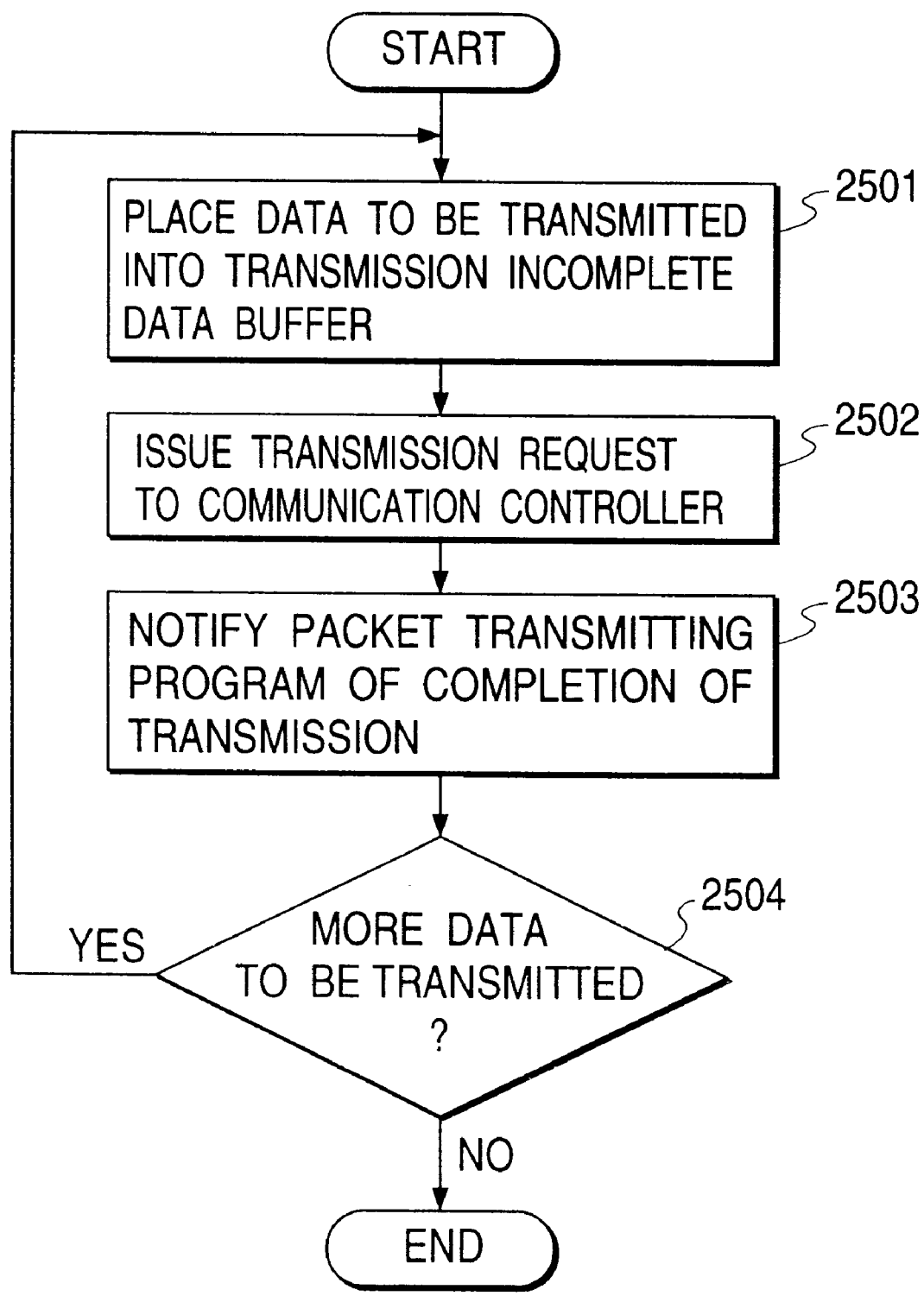
FIG. 9 is a flowchart of steps showing how a consecutive transmission controlling program of the first embodiment typically works.

FIG. 9 is a flowchart of the consecutive transmission controlling program 2406 of the host at data transmission. The consecutive transmission controlling program 2406 is called up by the packet transmitting program 2404 of FIG. 8. Step 2501, temporarily places in the transmission incomplete data buffer 2407 the data for which a transmission request has been issued by the packet transmitting program 2404. Step 2502 issues a transmission request to the communication controller 2408. Details of this step will be described later. The consecutive transmission controlling program 2406 notifies the packet transmitting program 2404 is notified of the completion of data transmission at this moment by the step 2503. This allows the packet transmitting program 2404 to regard as if the ACK has been returned for the transmitted data, and to request transmission of the next data. If more data to be transmitted is found to exist in step 2504, the process starting from the step 2501 is again repeated. The transmission incomplete data buffer 2407 retains its contents until the transmission is normally completed, in preparation for possible retransmission of lost packet data. Whereas the procedure of data retention is performed traditionally by the packet transmitting program 2404, the program 2404 here discards the data because the process is considered normally terminated by the step 2503.

Figure 10:
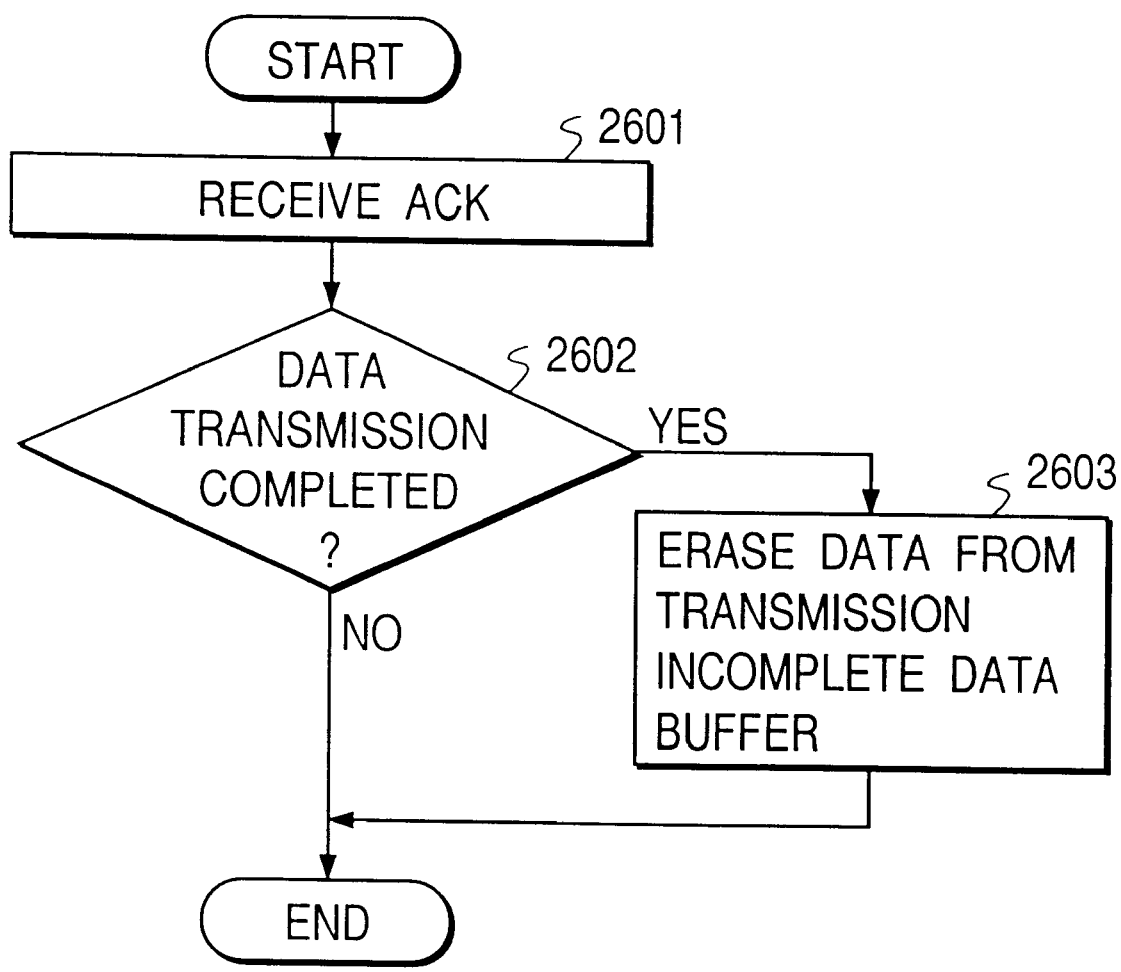
FIG. 10 is another flowchart of steps also showing how the consecutive transmission controlling program typically works.

FIG. 10 is a flowchart of the consecutive transmission controlling program 2406 at reception. In step 2601, an ACK is received from the transmitting side. In step 2602, a check is made to see if all user data has been transmitted. If the transmission is normal, the applicable data in the transmission incomplete data buffer 2407 is erased therefrom in step 2603. The processes of FIGS. 9 and 10 allow the ACK unit to be enlarged without modifying the existing programs. This is another advantage of the present invention.

Figure 11:
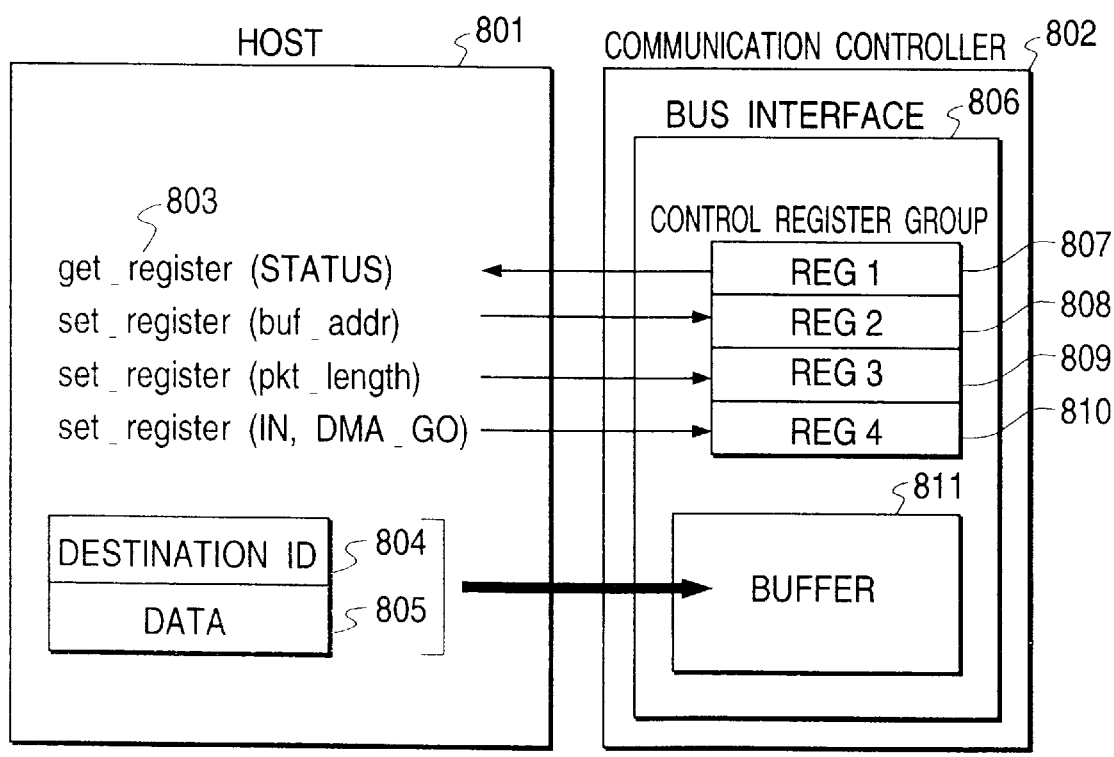
FIG. 11 is a block diagram depicting the transfer of data from a host to a communication controller.

FIG. 11 is a block diagram depicting how data is transmitted from a host 801 (corresponding to the host 101 of FIG. 1) to a communication controller 802 (corresponding to the communication controller 105 of FIG. 1). Reference numeral 803 points to details of the processing of step 2502 carried out by the consecutive transmission controlling program 2406.

(1) get_register (STATUS)

In this processing, the status of the communication controller 802 is acquired. When the status is found to be normal, the transmission processing continues.

(2) set_register (buf_addr)

In this processing, the start address of the transfer target data in the host 801 is written into one of a group of control registers (807 through 810) in the communication controller 802.

(3) set_register (pkt_length)

In this processing, the length of the transfer data in the host 801 is written into one register of the control register group (807 through 810) in the communication controller 802.

(4) set_register (IN, DMA_GO)

In this processing, an instruction issued to the DMAC 116 of FIG. 1 for data transfer to a buffer 811. The transferred data has the start address and the length both held in the control registers. The data in the host 801 is in packet format and comprises control information 804 such as the destination ID in addition to the user data 805.

Figure 12:
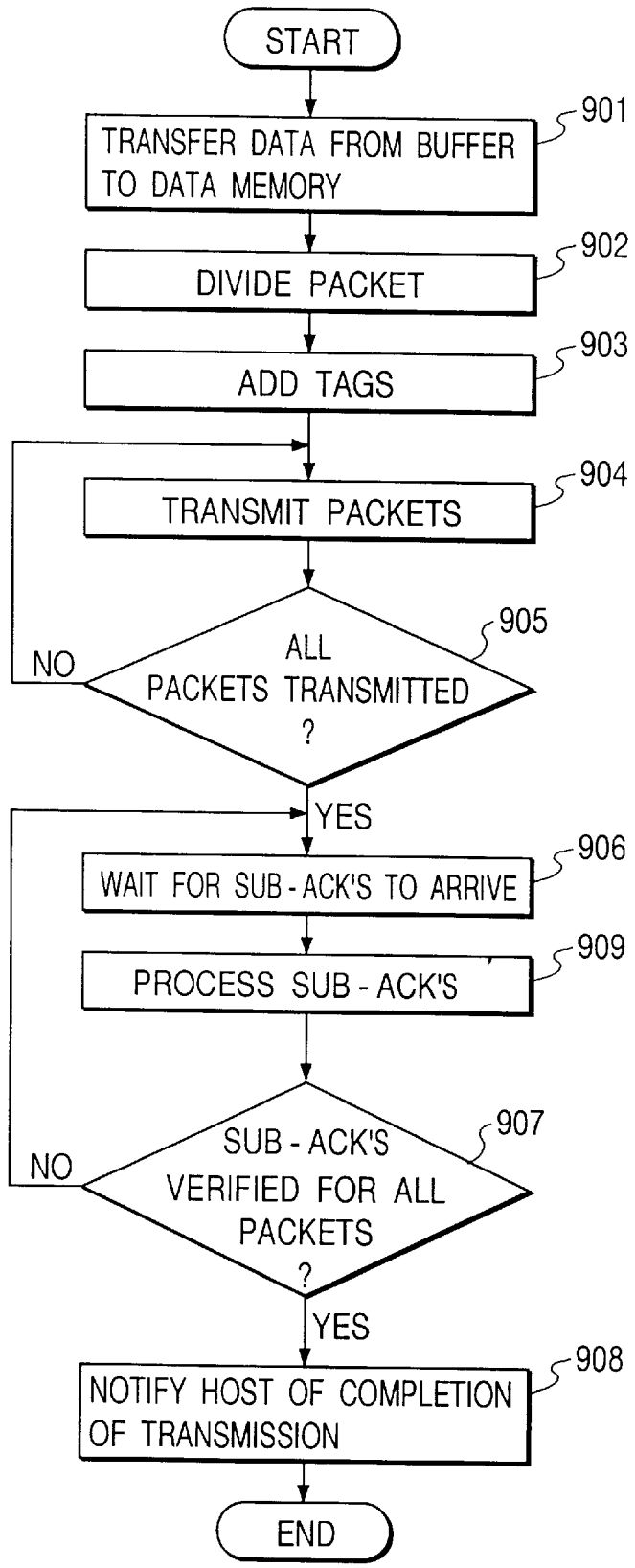
FIG. 12 is a flowchart of steps showing how a packet transmitting program of the first embodiment typically works.

FIG. 12 is a flowchart of the packet transmitting program 109 of the communication controller 105 of FIG. 1. In step 901, the data placed into the buffer 811 by the processing shown in FIG. 11 is transferred to the data memory 121. Following step 901, the communication controller 107 can control the data. In step 902, the packet data is divided into sub-ACK unit packets by the packet transmitting program 109 in accordance with a division unit. How the division unit is determined will be described later with reference to FIG. 14. In step 903, each of the sub-ACK unit packets derived through division from the packet data is furnished with tags 209 through 215 in FIG. 2. In step 904, the sub-ACK unit packets are transmitted to the destination. In this step, the control processor 107 transfers the packets to a buffer 124 of FIG. 1 via a communication interface 119 of FIG. 1 by use of a data transfer device 123 of FIG. 1. Then, the transmitter 126 transmits the sub-ACK unit packets according to the relevant protocol. In step 905, a check is made to see if all sub-ACK unit packets have been transmitted. If any sub-ACK unit packet has yet to be transmitted, step 904 is reached again and the packet in question is retransmitted. In steps 906, 909 and 907, sub-ACK's are awaited for all divided packets transmitted. After these steps have verified the sub-ACK's for all normally transmitted packets in sub-ACK units, it becomes possible to merge the sub-ACK's. If any sub-ACK indicates an abnormally transmitted packet, only the packet in question is retransmitted in step 909. When the sub-ACK's have been received from the destination indicating that all divided packets have been normally transmitted, the sub-ACK's are merged. In step 908, the packet transmitting program 109 notifies the host of the completion of data transfer.

How a packet is divided in step 902 of FIG. 12 will now be described in more detail with reference to FIGS. 13 and 14. FIG. 13 is a schematic view illustrating the structure of a transmission destination table which is held in the control memory 108, is controlled by the communication controller 105, and accommodates information for use upon packet division. In the table, column 1001 holds destination ID's representing previously accessed transmission destinations. New destinations may be added to the table. Column 1002 retains units of division. Different destinations have different distances to cover and need to be assigned an optimum division unit each. Column 1003 stores the response time registered when each destination was most recently accessed. The response time is the time required to send data of a specific length. Column 1004 holds the communication loads specific to the destinations. Column 1005 accommodates the direction of division for each destination. The direction of division indicates whether the current unit of division is to be enlarged or reduced. An indication "+1" means that the division unit is to be enlarged and "−1" means the division is to be reduced. Every time data is transferred, the response time column 1003 and communication load column 1004 are referenced and the division unit is updated in such a manner that the data transfer performance will be improved. Details of this process will be described later with reference to FIG. 14. The division unit is dynamically changed upon every access so that an optimum division unit will be gradually approximated. The transmission destination table is stored in the data memory 121 and backed up by the backup device 122. Thus the table is preserved unless and until the user forcibly resets the table contents. The use of the transmission destination table permits data transfer of constantly optimum performance.

Figure 14:
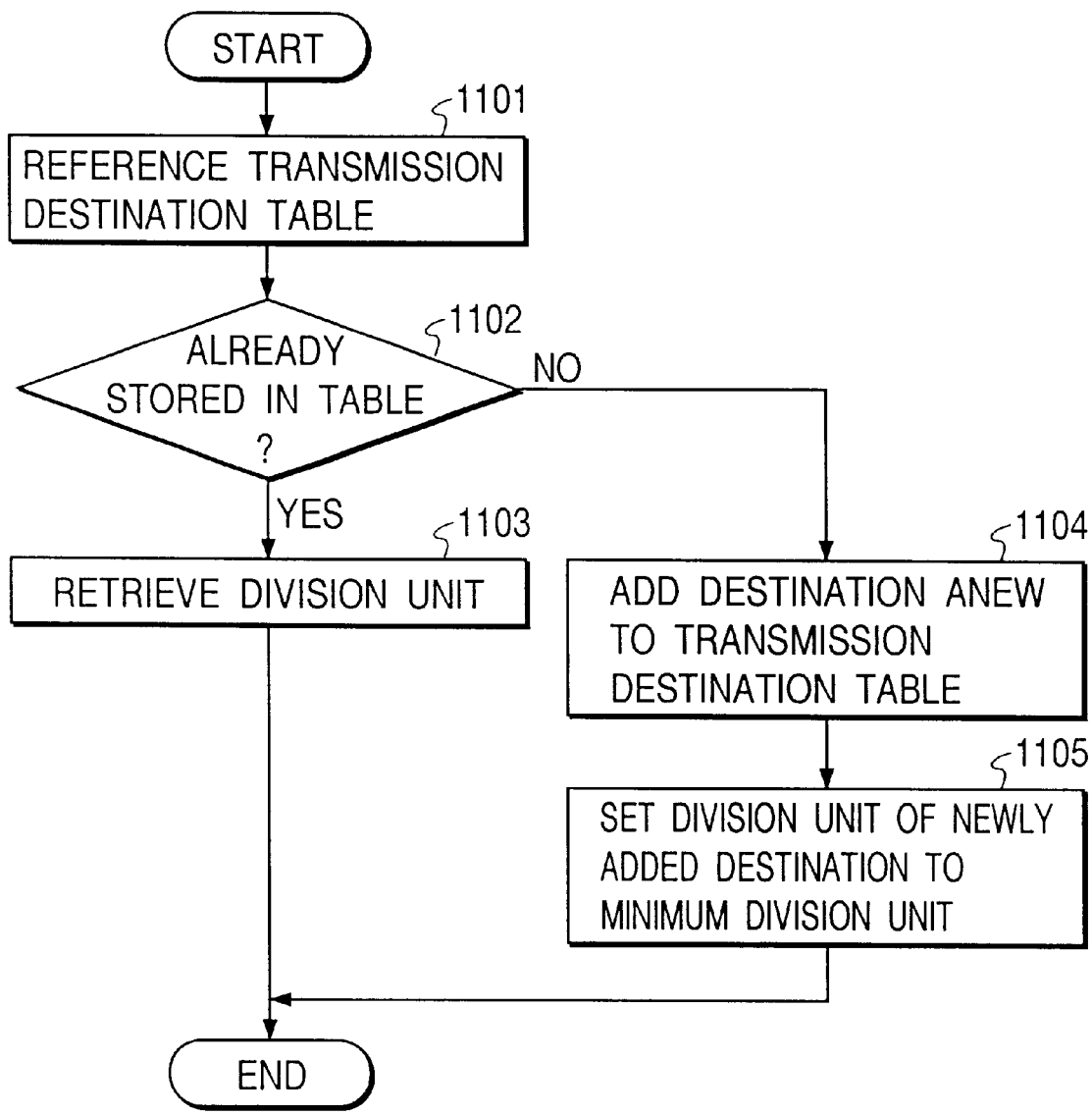
FIG. 14 is a flowchart of steps showing how a packet dividing program of the first embodiment typically works.

FIG. 14 is a flowchart of the packet dividing step 902 of FIG. 12. In step 1101, the transmission destination table of FIG. 13 is referenced. Upon data transfer to the communication controller 105, the host 101 attaches a destination ID (804 in FIG. 11) to the user data. In step 1102, a check is made to see if the attached destination ID is already stored in the transmission destination table of FIG. 13. If the destination ID is not found in the table, step 1104 is reached in which the destination is added anew to the table. In step 1105, the division unit of the newly added destination is set to the minimum division unit previously defined by the system. Step 1103 is reached if the destination is found in the transmission destination table. In this step, the division unit corresponding to the destination ID is retrieved from the table. In other words, if the destination is already stored in the transmission destination table, the corresponding stored division unit is used unchanged. Otherwise the minimum division unit is set for the newly added destination.

Figure 15:
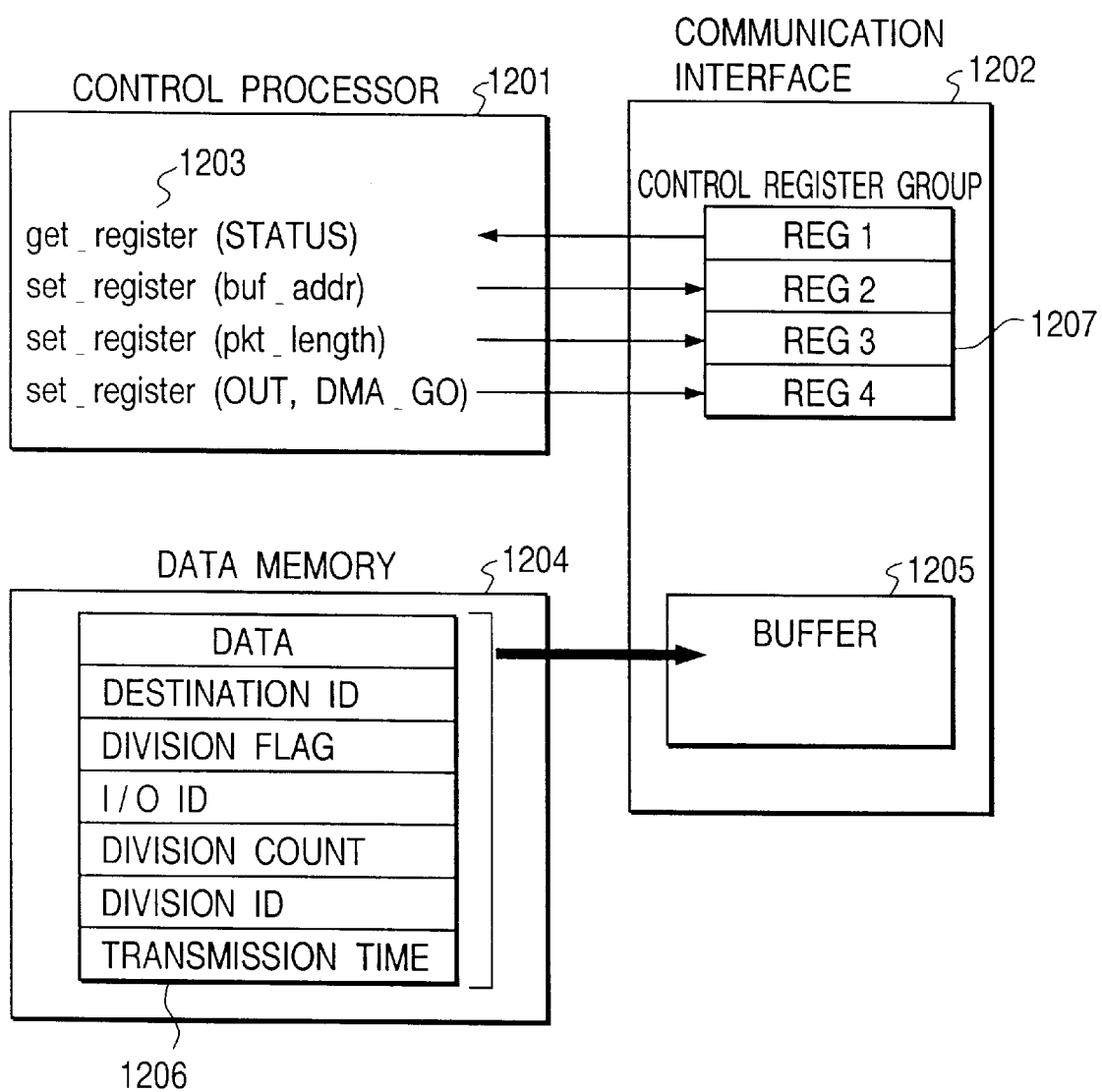
FIG. 15 is a conceptual view depicting the transfer of data from the communication controller to a network.

FIG. 15 depicts detailed operations of the packet transmitting step 904 in FIG. 12. The operations are performed to transfer data from the communication controller 105 to an external network. The instructions involved are as follows:
(1) get_register (STATUS)

In this process, the status of the communication interface 119 is acquired. If the status is normal, the transmission processing continues.
(2) set_register (buf_addr)

In this process, the first address of the transfer data 1206 in the data memory 121 is written into one of a group of control registers 1207 in the communication interface 119.
(3) set_register (pkt_length)

In this process, the length of the transfer data 1206 in the data memory 121 is written into a register of the control register group 1207 in the communication interface 119.
(4) set_register (OUT, DMA_GO)

This process is performed by the instruction issued to the DMAC 123 of FIG. 1 for data transfer to the buffer 124. The transferred data has the same length as that held in the control registers from the first address on. The processes above transfer the data 1206 from the data memory 121 to the buffer 124. In response, the communication interface 119 passes the data on to the transmitter 126 for packet transmission to the network.

Figure 16:
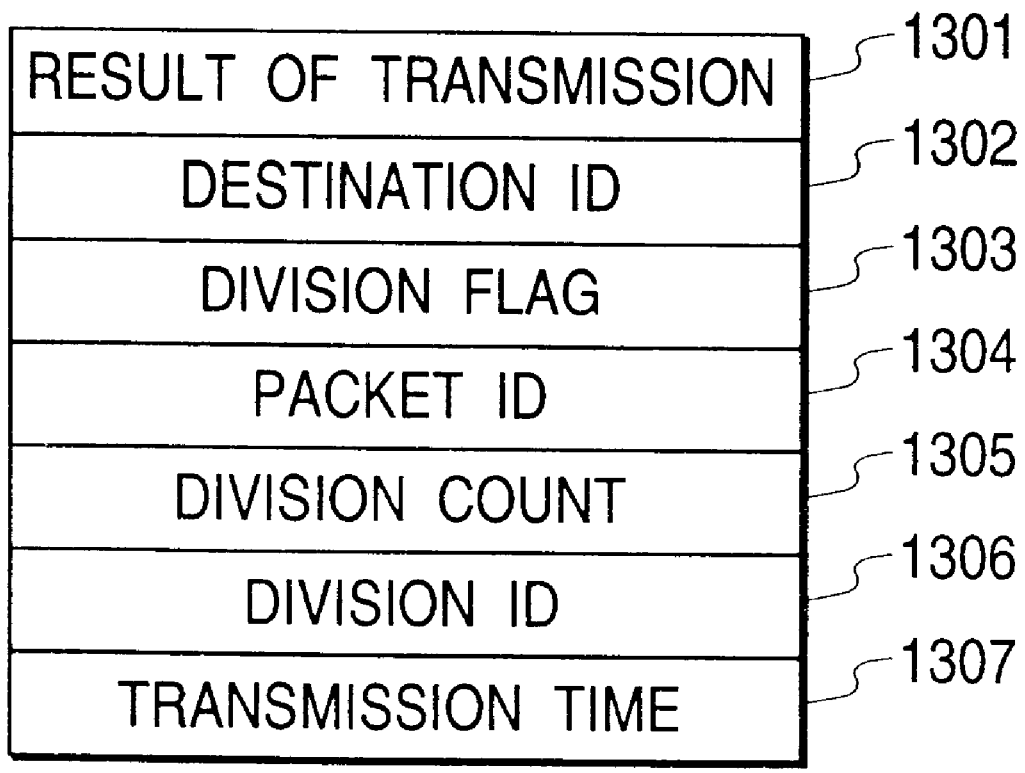
FIG. 16 is a conceptual view indicating the constitution of a sub-ACK packet.

FIG. 16 indicates the constitution of a sub-ACK packet returned for a packet by the receiving side to the transmitting side. The sub-ACK comprises the result of transmission 1301, a destination ID 1302 representing the destination of transmission, a division flag 1303 indicating a division, a packet ID 1304 identifying the packet, a division count 1305 indicating the number of packet divisions, a division ID 1306 indicating the post-division sequence, and a transmission time 1307 at which the transmitting side transmitted the packet. The result of transmission 1301 shows whether or not the packet has been normally received. Depending on the transmission result, the transmitting side determines whether or not to retransmit the packet in question.

It should be noted that the destination ID 1302, division flag 1303, packet ID 1304, division count 1305, division ID 1306 and transmission time 1307 are the same as those attached to the data packet sent from the transmitting side. The attached information of the data packet is tagged unchanged to the sub-ACK returned for the data packet.

Figure 17:
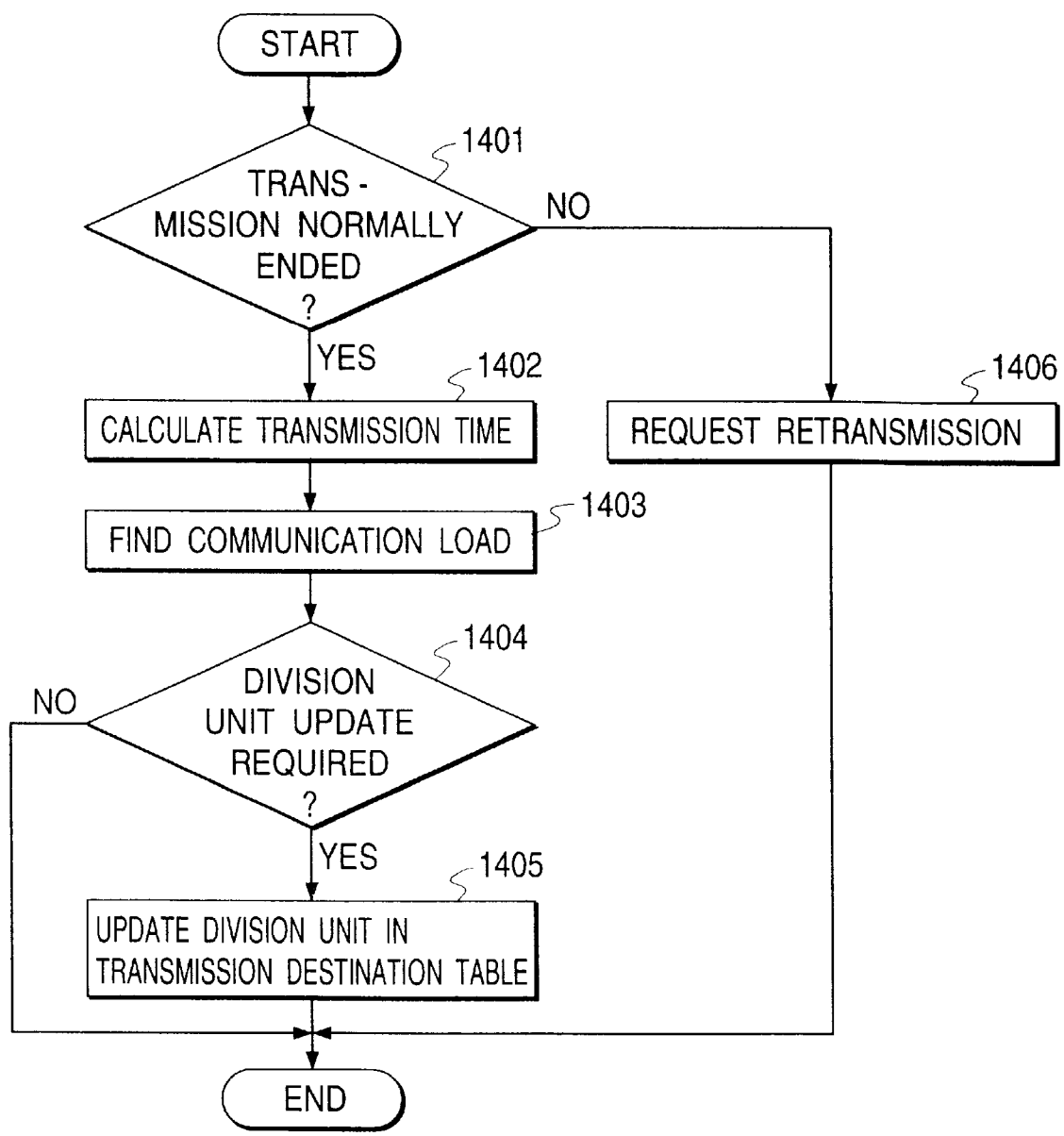
FIG. 17 is a flowchart of steps showing how a sub-ACK is received.

FIG. 17 is a flowchart of the sub-ACK processing step 909 in FIG. 12 for sub-ACK's of FIG. 16 received by the packet transmitting side. In step 1401, a check is made by referencing the transmission result 1301 of the sub-ACK to see if the divided packet has been normally transmitted. If the packet is found to be normally transmitted, step 1402 is reached; otherwise step 1406 is reached. In step 1406, a retransmission request is issued to the packet transmitting program of FIG. 12 (specifically step 904) regarding the abnormally transmitted packet. Step 904 of FIG. 12 started here is terminated when the packet has been retransmitted. At this point, a retransmission count is updated as will be described later by referring to FIG. 18 in connection with a sub-ACK control table. In step 1402, the time required for the transmission is calculated. The result of the calculation serves as a parameter for determining an optimum division unit. The calculation may be performed by finding the difference between the transmission time 1307 in FIG. 16 and the current time. Specific means for knowing the time may illustratively be a timer incorporated in the communication controller. In step 1403, the current network load is obtained by the communication load measuring device 120 of FIG. 1. The communication load measuring device 120 is designed to acquire the current load of the network to which the communication controller 105 is connected. The network load is detected by checking to see how many packets have been received by the receiver 125 within a unit time. The load thus acquired serves as a parameter for determining an optimum division unit. In step 1404, a check is made to see if the division unit 1002 currently held in the transmission destination table (FIG. 13) is appropriate. The check in step 1404 is made by comparing the response time 1003 and communication load 1004 in the transmission destination table (FIG. 13) on the one hand, with the currently acquired response time and communication load on the other hand. The division unit needs to be updated in two cases: when the current communication load is smaller than the communication load 1004 held in the transmission destination table (FIG. 13) and the current response time is smaller than the stored response time; or when the current communication load is smaller than the communication load 1004 in the transmission destination table and the currently obtained response time is larger than the stored response time. In the former case, the stored division unit is updated in the forward direction of the currently obtained division unit. In the latter case, the update is performed in the opposite direction of the currently acquired division unit. The updating is executed in step 1405. Specifically, where the update is in the forward direction (i.e, +), the stored division unit is enlarged. For example, the stored division unit of 2 KB is replaced by 4 KB. If the update is in the opposite direction (i.e., –), the stored division unit is reduced. Illustratively, the stored division unit of 4 KB is replaced by 2 KB. Such updates make it possible to reduce the division unit for long distances and to enlarge it for short distances. This is because the long-distance transmission takes more time for sub-ACK's to be returned and has a good response time with the smallest possible division unit.

Where the retransmission count, to be described with reference to FIG. 18, is used as one parameter for dividing the packet, the data transfer performance may be improved further. This is particularly effective where many errors are prone to occur during data communication with a specific host. When the retransmission count is found to increase, the retransmission time can be shortened by reducing the division unit. For example, if numerous retransmission requests occur with the division unit of 8 KB in effect, the retransmission overhead may be lowered by setting a smaller division unit such as 4 KB. How the retransmission process is carried out will be described later in detail with reference to FIG. 19.

Below is a description of the network load. The network is not for use by a single user; a plurality of users are expected to transfer data concurrently over the network. In such cases, the network load will rise causing the response of data transfer to worsen. The deterioration of response is not related to the distance of communication. Thus by detecting the network load and using it as a parameter for determining the division unit, the first embodiment of the invention can discriminate those variations in response which are not attributable to distance. Although the first embodiment has the communication load column 1004 established in the transmission destination table (FIG. 13), the column may be replaced alternatively by a column for holding communication distances. If implemented, the communication distance column will allow the division unit 1002 to be obtained more accurately. The communication distances are to be set previously by the user for the stored destinations, and new destinations may be added to the table and matched with the correspondingly furnished communication distances to ensure higher performance.

How a plurality of sub-ACK's are awaited will now be described with reference to FIG. 18. The process involves executing steps 906 and 907 of FIG. 12 to wait for the divided sub-ACK's to arrive. Which sub-ACK has been received at any given moment is known by use of a sub-ACK control table of FIG. 18 established in the data memory 121. Column 1501 accommodates packet ID's representing the same contents of the packet ID's 212 in the packets 208 of FIG. 2. Likewise, column 1502 holds division ID's that are the same as the division ID's 214 in the packets 208. Each division ID 1502 corresponds to a sub-ACK. Information on whether or not a sub-ACK for a specific division ID 1502 has been received is written to column 1503. If all sub-ACK's are found to be returned, that means the completion of data transfer, which verifies the end of step 906. The sub-ACK control table is generated upon division of a packet (step 902 in FIG. 12).

Figure 19:
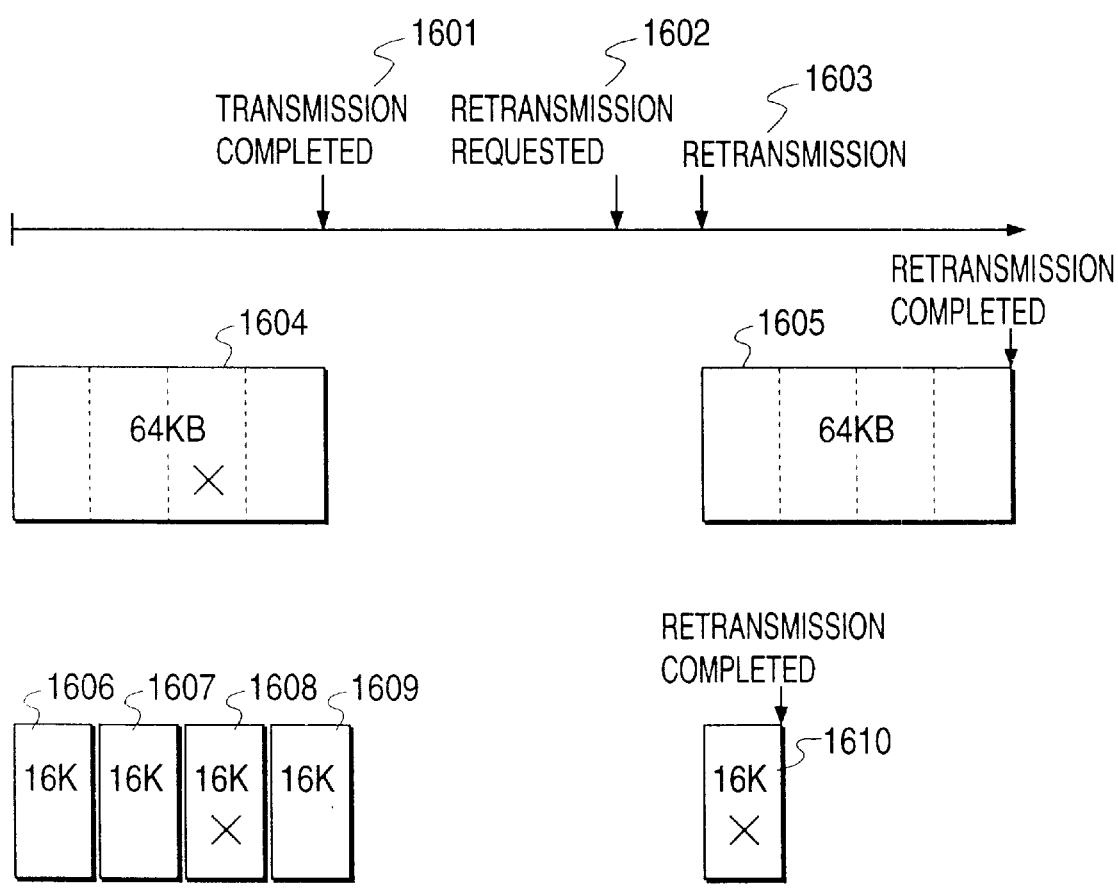
FIG. 19 is a conceptual view outlining the effects of the first embodiment.

FIG. 19 shows that data may be retransmitted at high speed when the division unit is small. Reference numeral 1604 indicates a set of data transmitted in a large unit and 1605 denotes a packet of the same data retransmitted. Reference numerals 1606 through 1609 indicate the data being transmitted in smaller units, and 1610 stands for one packet of the retransmitted data. In many cases where retransmission is requested, only a part of the data is erroneous. In such cases, the entire data must be retransmitted (1605) if the packet is large enough (1604). By contrast, if the division unit is small, it may take more time to transmit data but the subsequent retransmission thereof will end quickly because the latter process involves an appreciably low amount of data. As a result, the overall time for data transfer is shortened.

Figure 20:
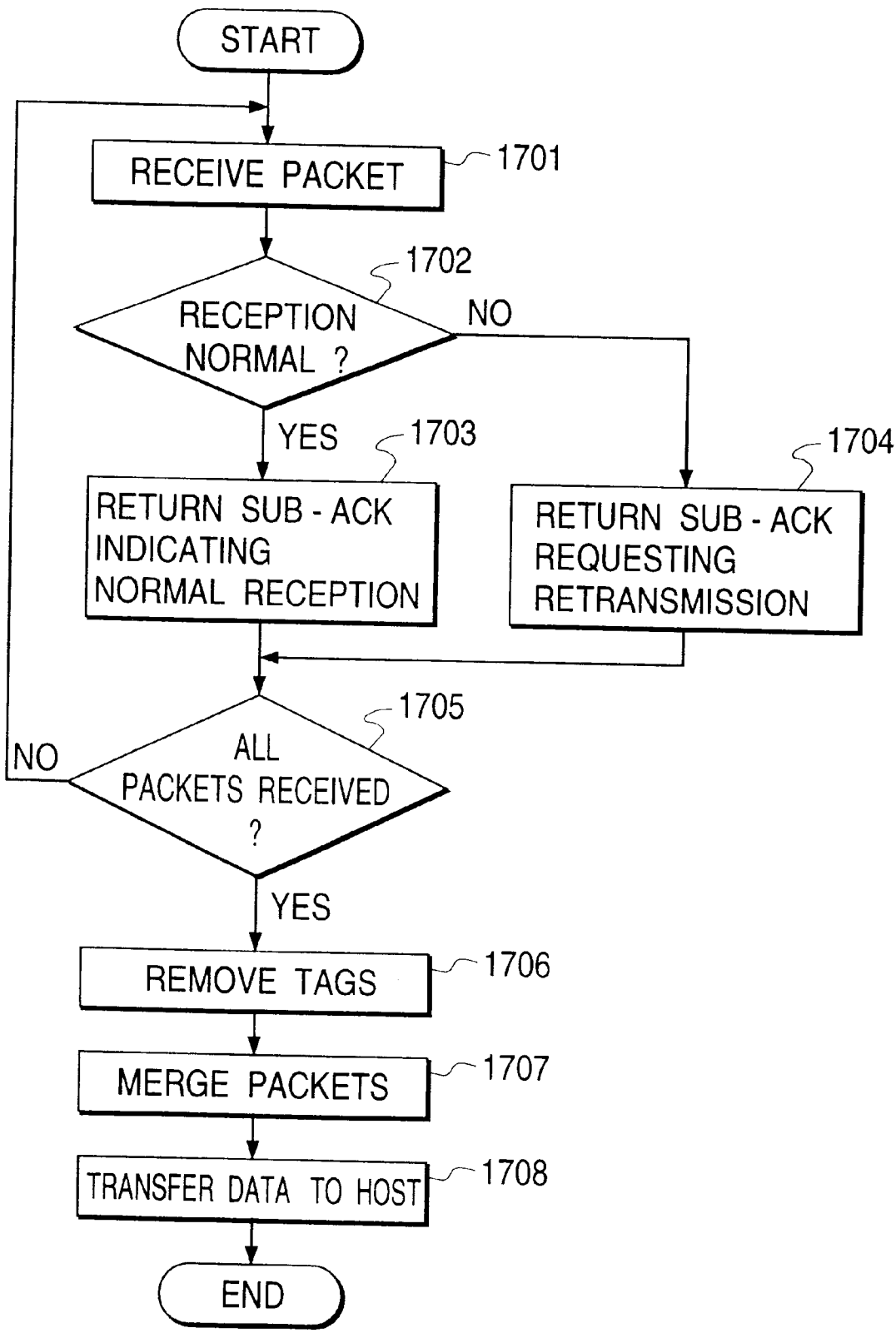
FIG. 20 is a flowchart of steps showing how a packet receiving program of the first embodiment typically works.

FIG. 20 is a flowchart of the packet receiving program 112 of the communication controller 105 of FIG. 1. In step 1701, a packet is received via the communication interface 119. In step 1702, a check is made to see if the packet has been normally received. If the reception of the packet is found to be normal, step 1703 is reached; otherwise step 1704 is reached. Whether or not the packet is normally received is verified illustratively by use of a scheme wherein the transmitting side attaches parity or cyclic redundancy check bits to the transmitted data and the receiving side checks the attached bits. In step 1703, a sub-ACK indicating the normal reception of data is returned to the transmitting side. In step 1704, a sub-ACK indicating an abnormal receipt of data is returned to the transmitting side. In step 1705, a check is made to see if all sub-ACK units have been received. The check in step 1705 is accomplished by referring to the division flag 211, packet ID 212, division count 213 and division ID 214 shown in FIG. 2. In step 1706, the tags 210 through 215 in FIG. 2 are removed from the transmitted data so that only the data part is left. The removed tags are retained corresponding to the data and are used in the next step (1707). In step 1707, the divided data are merged according to the division ID 214. In step 1708, the merged data is transferred to the host and the packet receiving process is terminated.

Figure 21:
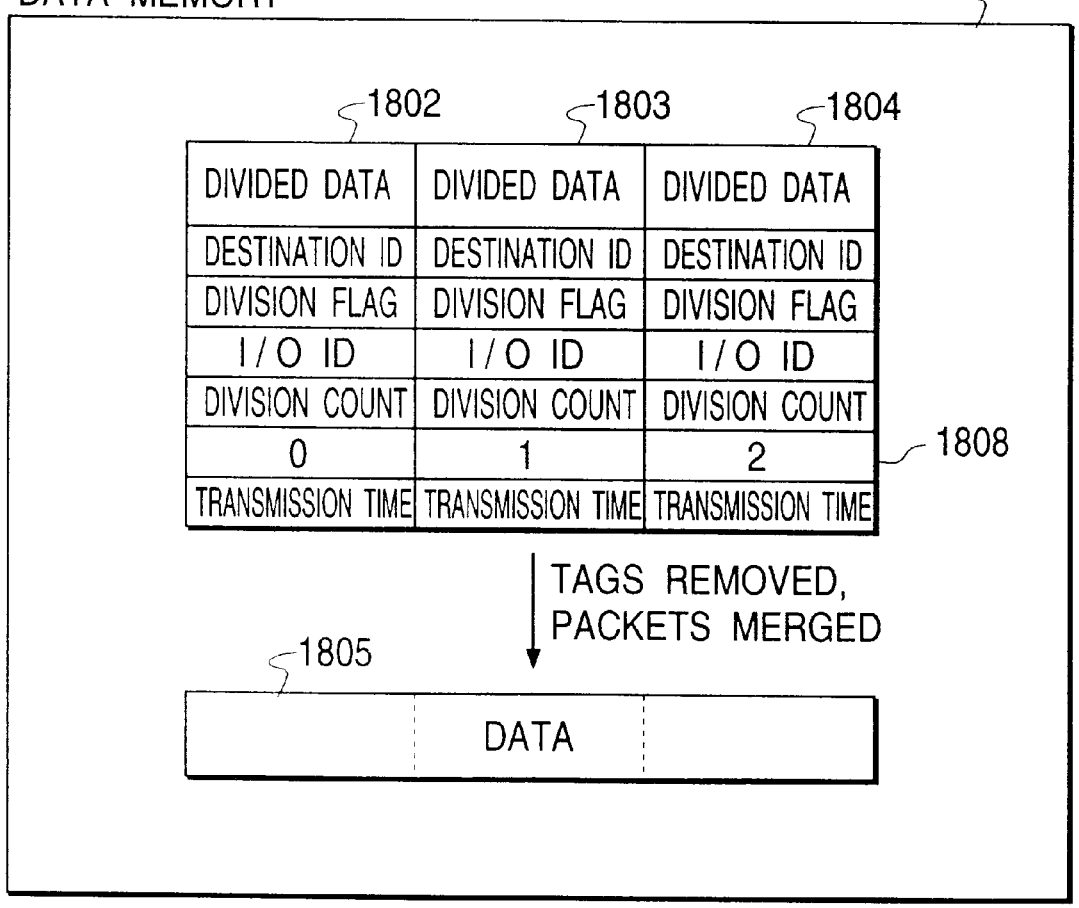
FIG. 21 is a conceptual view indicating how tags are removed and data are merged.

FIG. 21 is a conceptual view indicating how divided data are merged. The example of FIG. 21 is one in which three packets 1802, 1803 and 1804 are merged. The divided data extracted from the three packets are merged into one set of data (1805). The initial data, i.e., the data transmitted by the host of the transmitting side to the communication controller, is reconstructed by merging the divided data in accordance with division ID's 1808.

Figure 22:
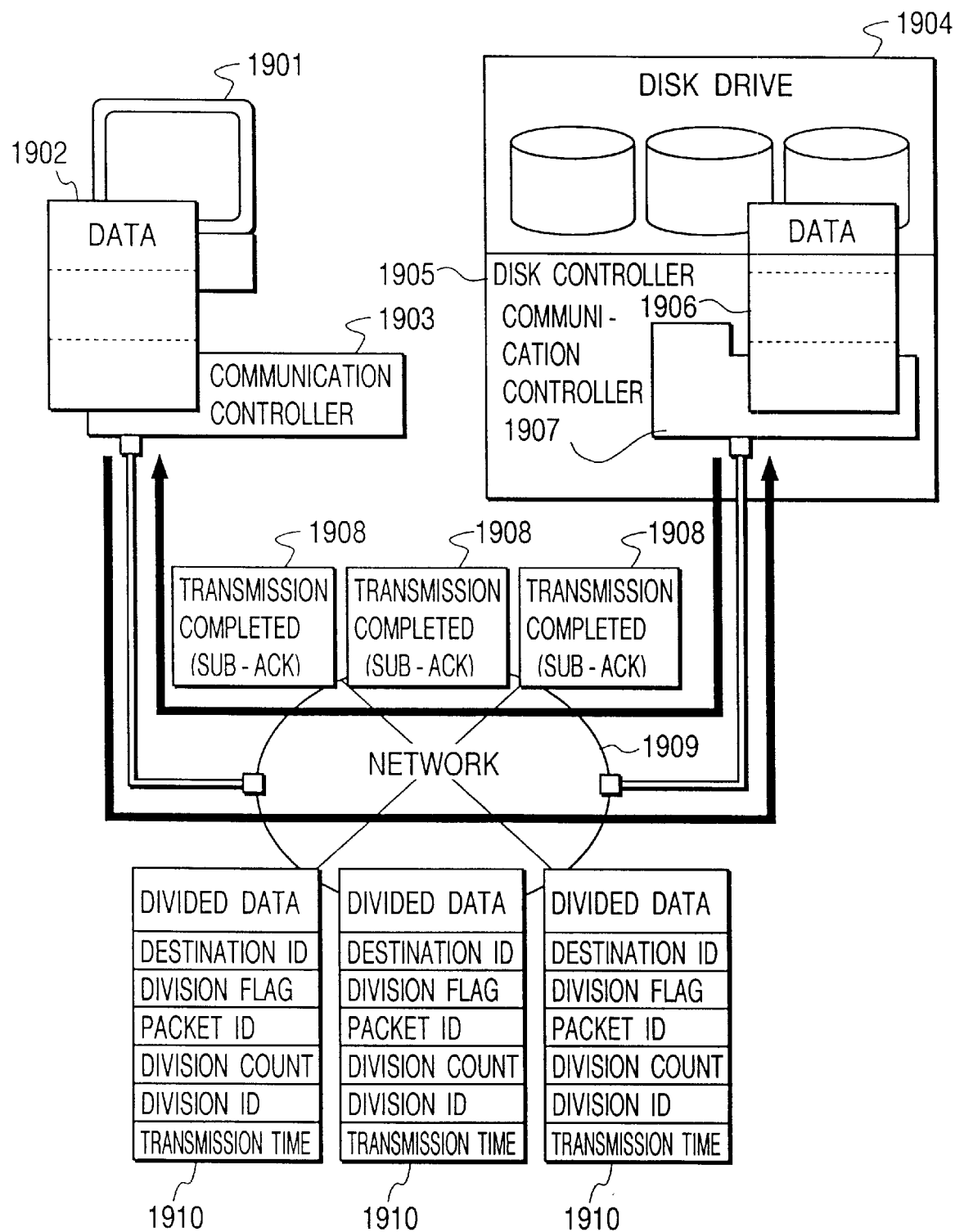
FIG. 22 is a conceptual view sketching how the invention is applied to a disk drive arrangement.

FIG. 22 is a conceptual view sketching how the invention is applied illustratively to a disk drive arrangement. Whereas the description of the invention above has centered on data communication between hosts, the invention is intended to boost the speed of data communication and as such can be applied generally to data communication setups including the disk drive arrangement. FIG. 22 shows a process in which a computer 1901 (host) connected to a network 1909 transmits data 1902 (in the ACK unit for the host) to a disc controller 1905 of a disk drive 1904. Reference numeral 1906 denotes the data received by the disk controller 1905. The computer 1901 is connected to a communication controller 1903, and the disk controller 1905 is connected to a communication controller 1907. The data 1902 sent from the computer 1901 is divided by the communication controller 1903 into three sub-ACK unit packets 1910. As in the example of FIG. 2, each packet 1910 comprises divided user data and is furnished with tags such as the destination ID, division flag indicating a division, packet ID, division count, division ID indicating the post-division sequence, and transmission time at which the packet was transmitted. Upon receipt of the packets, the communication controller 1907 removes the tags from the packets to reconstruct the initial data 1906. For data reconstruction, the communication controller 1907 references the division flag, packet ID, division count, and division ID indicating the post-division sequence of each packet as in the case of FIG. 2. For each packet received, the communication controller 1907 returns a sub-ACK 1908 indicating the completion of packet transmission. If any one of the three transmitted packets has developed transmission error, the occurrence of the error is written to the sub-ACK 1908 corresponding to the abnormally transmitted packet. In response to the sub-ACK, the communication controller 1903 retransmits only the packet corresponding to that sub-ACK. There is no need to retransmit all packets 1902 constituting the entire data where any one of the packets has developed transmission error. When the sub-ACK's are returned indicating the normal reception of all divided packets by the receiving side, the three sub-ACK's are merged into one ACK which notifies the host 1901 of the completion of data transmission. Because user data is divided into sub-ACK unit packets each provided with the division flag, packet ID, division count, and division ID indicating the post-division sequence ID, the packets are transmitted and received independently and hence in parallel. Where a plurality of disk drives 1904 are connected to the disk controller 1905, the disk controller 1905 may process a plurality of disk I/O requests concurrently. This is a significant advantage available with the embodiment of the invention allowing the host 1901 to transfer data at high speed. Because sub-ACK units are adopted and they are merged before transfer to the host computer, i.e., to the source of the request, the protocol requirements of the first embodiment are the same as those of conventional communication protocols and thus involve only a minimum of modifications in the software of the host upon implementation. In addition, the greater the amount of transfer data, the more efficient the parallel transfer of data carried out for transmission and reception with the first embodiment.

Second Embodiment

Figure 23:
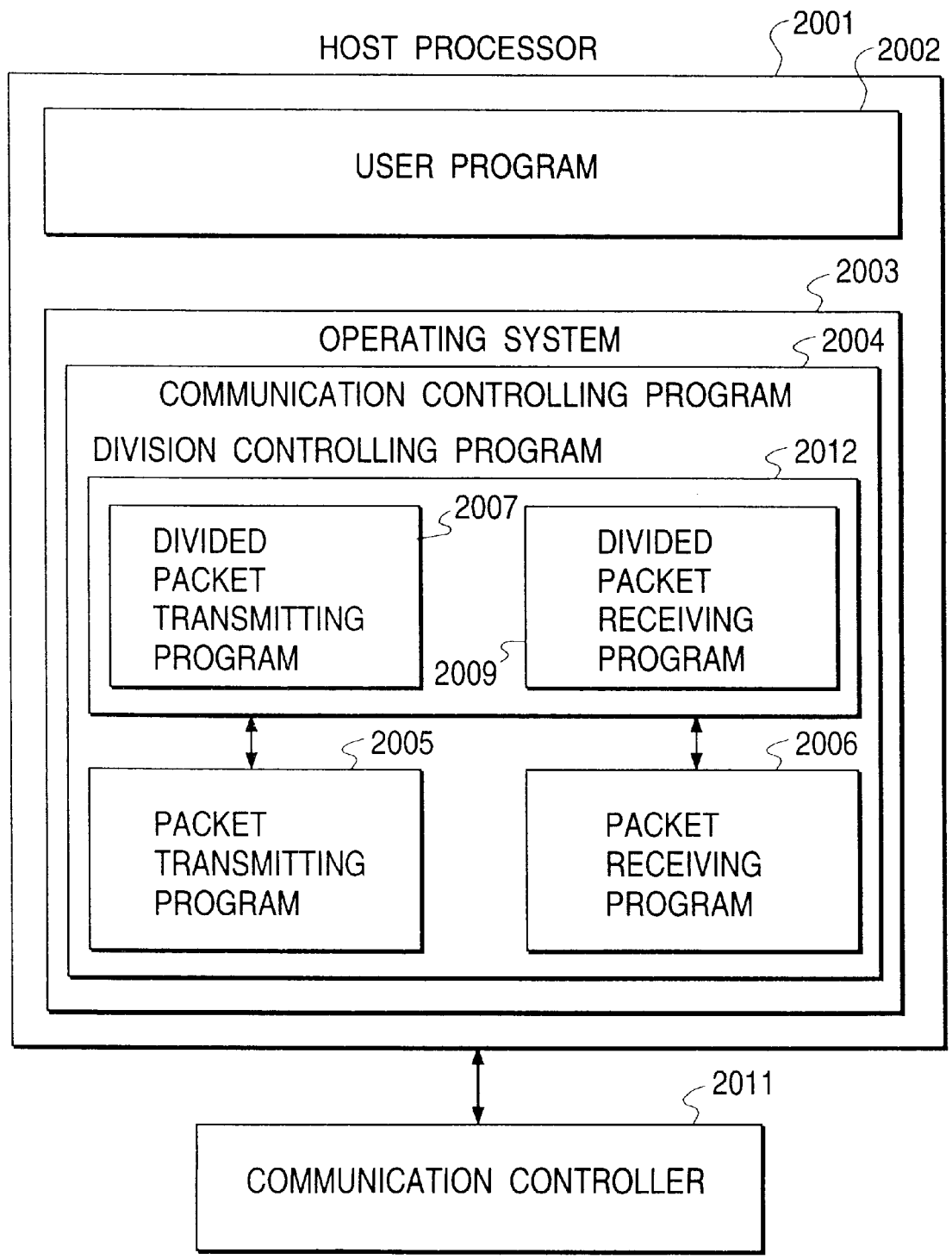
FIG. 23 is an overall block diagram of a second embodiment of the invention.

FIG. 23 is a block diagram of a software implementation of the invention. In FIG. 23, reference numeral 2001 is a host and 2011 is a communication controller. Working inside the host 2001 are a user program 2002 and the operating system 2003. The operating system 2003 includes a communication controlling program 2004 which in turn comprises a division controlling program 2012, a packet transmitting program 2005 and a packet receiving program 2006. The division controlling program 2012 incorporates a divided packet transmitting program 2007 and a divided packet receiving program 2009. A communication request issued by the user program 2002 to the network is first received by the communication controlling program 2004. Later, control is passed on to the division controlling program 2012 whose detailed workings will be described later. The packet transmitting program 2005 and packet receiving program 2006 are known programs, and the communication controller 2011 is a know device.

Figure 24:
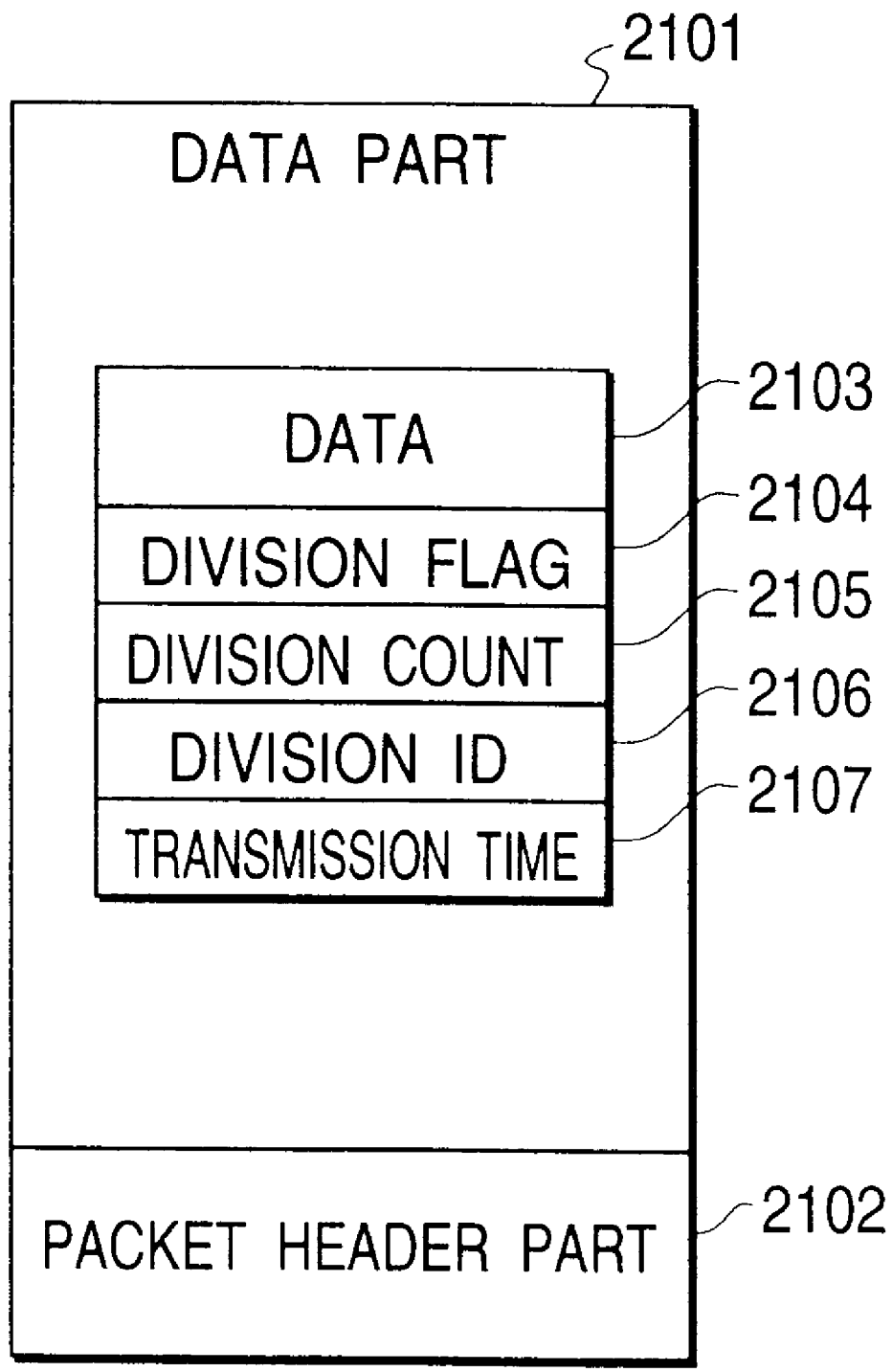
FIG. 24 is a conceptual view portraying the constitution of a packet for use with the second embodiment.

The second embodiment utilizes a conventional system when implemented. The packet transmitting program 2005 and packet receiving program 2008 deal with packets each comprising two major parts, a data part 2101 and a packet header part 2102, as shown in FIG. 24. The data part 2101 is provided by the division controlling program 2012. Whereas the first embodiment attaches specific tags to the packet header part, the second embodiment cannot modify the packet header because it utilizes the existing system. Thus the second embodiment attaches to the data part 2101 those tags (2104 through 2109) that are necessary for dividing packets. Besides user data, 2103, each packet is furnished with such tags as a division flag 2104 indicating a divisions a division count 2105 representing the number of packet divisions, a division ID 2106 indicating the post-division sequence, and a transmission time 2107 at which the packet was transmitted.

Figure 25:
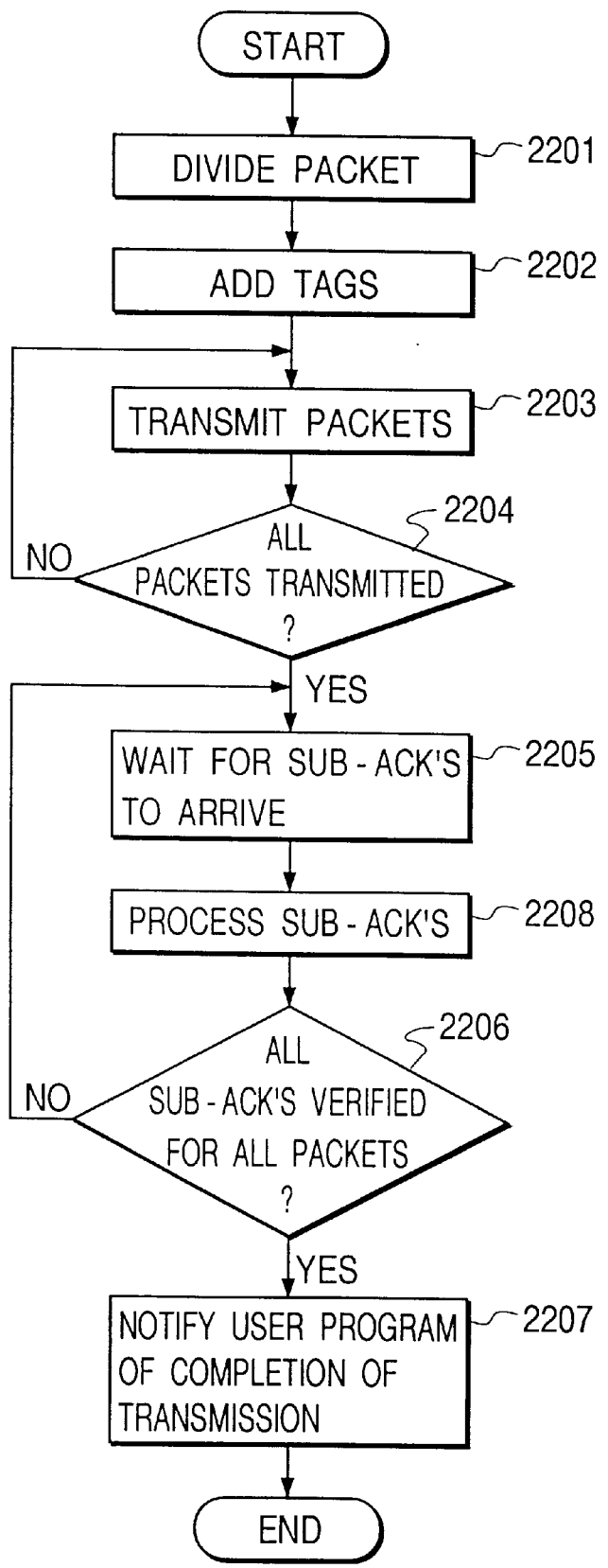
FIG. 25 is a flowchart of steps showing how a divided packet transmitting program of the second embodiment typically works.

FIG. 25 is a flowchart of steps showing how the divided packet transmitting program 2007 typically operates. In step 2201, the packet is divided into sub-ACK units. The details of step 2201 are the same as those of the first embodiment in FIG. 14. In step 2202, each of the divided sub-ACK unit packets is given the tags 2104 through 2107 shown in FIG. 24. In step 2203, the sub-ACK unit packets are transferred to the destination. In step 2204, a check is made to see if all sub-ACK units have been transmitted. If there exist any sub-ACK unit packets yet to be transmitted, step 2203 is reached again and executed. In steps 2205, 2208 and 2206, sub-ACK's are awaited for all transmitted packets. When sub-ACK's have been received indicating the normal reception of all the packets, it is now possible to merge the sub-ACK's. This allows the user program 2202 to remain unaware of the division of the packet. If there is a sub-ACK indicating an abnormally transmitted packet, that packet alone is retransmitted in step 2208. Step 2208 is the same in function as step 909 in FIG. 12. When all sub-ACK's have been merged, step 2207 is reached in which the user program 2002 is notified of the completion of data transfer.

Figure 26:
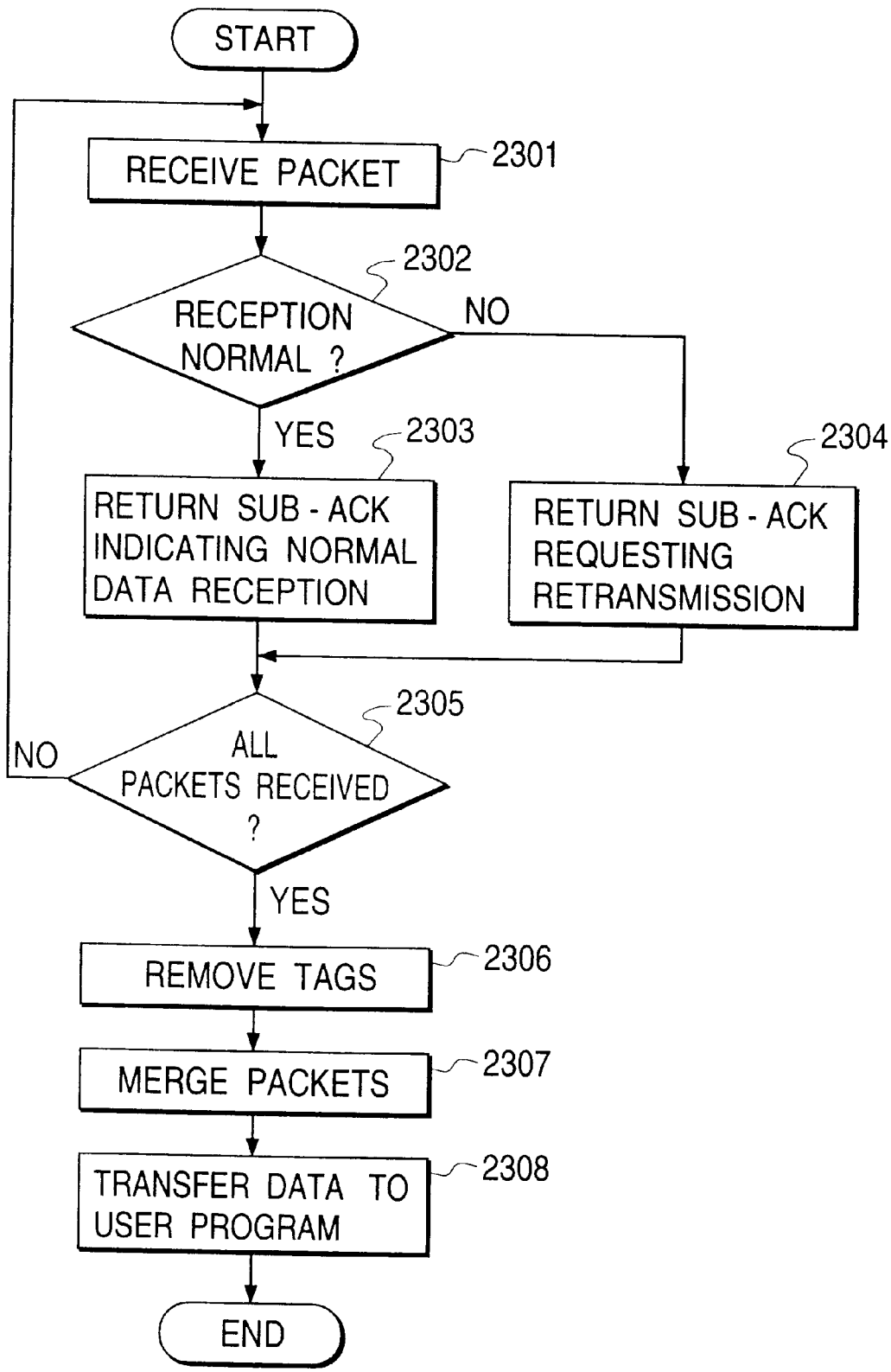
FIG. 26 is a flowchart of steps showing how a divided packet receiving program of the second embodiment typically works.

FIG. 26 is a flowchart of steps of the divided packet receiving program 2009. In step 2301, a packet is received via the packet receiving program 2006. In step 2302, a check is made to see if the packet has been normally received. If the receipt of the packet is found to be normal, step 2303 is reached; otherwise step 2304 is reached. In step 2303, a sub-ACK indicating the normal reception of data is returned to the transmitting side. In step 2304, a sub-ACK indicating an abnormal receipt of data is sent back to the transmitting side. In step 2305, a check is made to see if all sub-ACK unit data have been received The check in step 2305 is accomplished by referring to the division flag 2104, division count 2105 and division ID 2106 of each packet shown in FIG. 24. In step 2306, the tags 2104 through 2107 in FIG. 24 are removed from each packet so that only the data part is left. In step 2307, the divided data are merged in accordance with the division ID's 2106. In step 2308, the merged data is transferred to the user program 2002 and execution of the divided packet receiving program is 2009 terminated.

Figure 27:
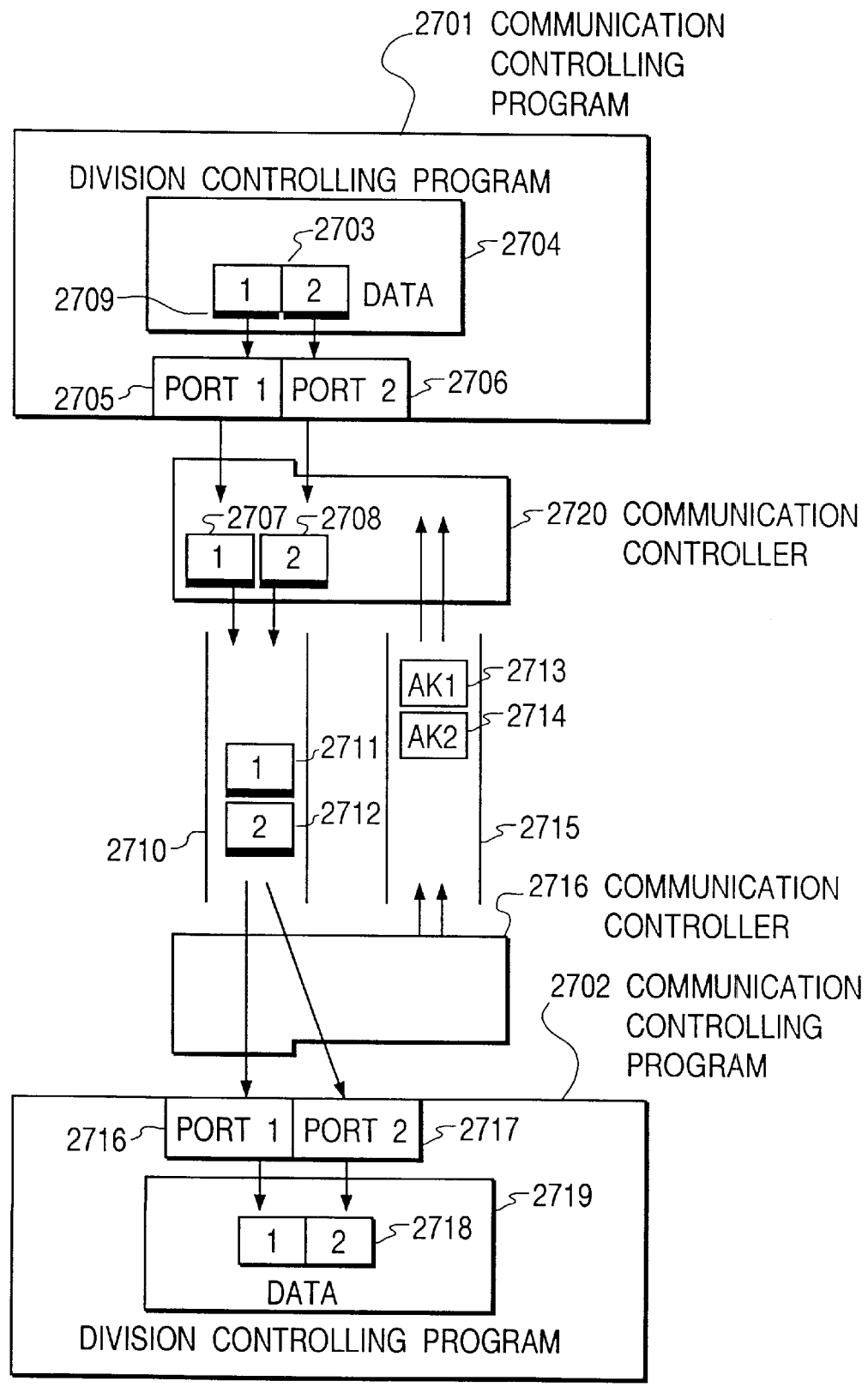
FIG. 27 is a conceptual view indicating how packets are consecutively transmitted in a multiple port setup of the second embodiment.

FIG. 27 illustrates schematically the principles of packet division of the second embodiment. The known packet transmitting program 2005 and packet receiving program 2006 are each provided with a plurality of I/O ports for communication. The I/O ports are made to correspond with the destinations of communication on a one-to-one basis. Because the next packet cannot be transmitted through the same port until the normal receipt of the current packet is ascertained by a returned ACK, the packet dividing function of the invention cannot be implemented using the same port. Thus the second embodiment has at least two ports (2705, 2706, 2716, 2717) assigned to each of the communication controlling program 2701 of the transmitting side and the communication controlling program 2702 of the receiving side dealing with one set of user data. In consecutive packet transmission this setup makes it possible to transfer the next packet independently of the ACK returned for the most recently transmitted packet. The division controlling programs 2704 and 2719 transfer user data 2703 and 2718 independently through each of the ports in use 2711 and 2712. It is also possible to return sub-ACK's 2713 and 2714 independently through each of the ports. With the second embodiment communication controllers 2720 and 2719 need only perform conventional operations. Other detailed processes and the table arrangements are the same as those of the first embodiment. The second embodiment has the advantage of eliminating the need for any modifications in the conventional hardware or in the current operating system 2003.

As described the invention minimizes deterioration of the data transfer performance where long distances are involved for data communication.

What is claimed is:

1. A method for transmitting data via a network host in a transmitting side to a receiving side, comprising the steps of:

transmitting said data packet from said host to a communication controller in said transmitting side;

dividing said data packet into a plurality of data packets by said communication controller;

transmitting said divided data packets from said communication controller to said receiving side;

transmitting, for each of said divided data packets, a sub-acknowledgement signal indicating whether said receiving side has normally received a corresponding one of the divided data packets, from said receiving side to said communication controller; and transmitting a single acknowledgement signal, generated by said communication controller, from said communication controller to said host, after said communication controller has normally received all of said sub-acknowledgement signals.

2. A method for transmitting a data packet via a network according to claim 1, wherein said communication controller transmits said divided data packets without waiting for any of the sub-acknowledgement signals.

3. A method for transmitting a data packet via a network according to claim 1, further comprising a step of retransmitting only the divided data packets for which said communication controller has not normally received corresponding sub-acknowledgement signals.

4. A method of transmitting a data packet via a network according to claim 1, further comprising a step of determining the division size of said divided data packets based on a communication condition of said network.

5. A method of transmitting a data packet via a network according to claim 4, wherein said communication condition of said network includes at least one of a transmission time required for transmission of data over said network and the load on said network.

6. A method for transmitting a data packet via a network according to claim 1, wherein, when said network comprises two networks having different communication paths, said divided data packets are transmitted via one communication path and said sub-acknowledgement signals are transferred via the other communication path.

7. A method for transmitting data via a network, comprising the steps of:

transmitting a data packet with a destination identifier attached, from a host in a transmitting side to a communication controller in said transmitting side;

dividing said data packet into a plurality of data packets by said communication controller, in response to a division size stored in a table for said destination identifier;

transmitting said divided data packets from said communication controller to a receiving side corresponding to said destination identifier;

transmitting, for each of said divided data packets, a sub-acknowledgement signal indicating whether said receiving side has normally received a corresponding one of the divided data packets, from said receiving side to said communication controller;

transmitting a single acknowledgement signal, generated by said communication controller, from said communication controller to said host, after said communication controller has normally received all of said sub-acknowledgement signals; and updating said division size in response to a communication condition of said network.

8. A method of transmitting data via a network according to claim 7, further comprising the steps of:

measuring a transmission time indicating the time required for transmission of said data packet from said transmitting side to said receiving side, and reducing said division size if said transmission time exceeds a predetermined value.

9. A method of transmitting data via a network according to claim 8, further comprising the steps of:

attaching time when a packet is transmitted to each of said divided data packets, and attaching said time to each of said sub-acknowledgement signals, wherein the step of updating said division size comprises calculating the time required for transmission from the difference between said time attached to said sub-acknowledgement signal and the current time.

10. A method for transmitting data via a network according to claim 7, further comprising the steps of:

retransmitting only the divided data packets for which said communication controller has not normally received corresponding sub-acknowledgement signals, and reducing said division size if the number of retransmitted divided data packets exceeds a predetermined value.

11. An apparatus transmitting data via a network comprising:

a communication controller arranged to divide a data packet transmitted by a host into a plurality of data packets, transmit said divided data packets to a receiving side, generate an acknowledgement signal, and transmit said acknowledgement signal to said host after it has normally received sub-acknowledgement signals from said receiving side for all of said divided data packets, wherein each of said sub-acknowledgement signals indicates whether or not said receiving side has normally received a corresponding one of the divided data packets.

12. An apparatus transmitting data via a network according to claim 11, wherein said communication controller transmits said divided data packets without waiting for any of the sub-acknowledgment signals.

13. An apparatus for transmitting data via a network according to claim 11, wherein said communication controller retransmits only the divided data packets for which it has not normally received corresponding sub-acknowledgement packets.

* * * * *